US009813150B1

(12) United States Patent
Bitra et al.

(10) Patent No.: US 9,813,150 B1
(45) Date of Patent: Nov. 7, 2017

(54) CONTROLLABLE SELECTION OF LIGHT-CAPTURE DEVICES

(71) Applicant: QUALCOMM Incorporated, San Diego, CA (US)

(72) Inventors: Suresh Kumar Bitra, Mangalagiri (IN); Meghna Agrawal, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/274,508

(22) Filed: Sep. 23, 2016

(51) Int. Cl.
*H04B 10/116* (2013.01)
*H04W 4/02* (2009.01)

(52) U.S. Cl.
CPC .......... *H04B 10/116* (2013.01); *H04W 4/021* (2013.01)

(58) Field of Classification Search
CPC ............................... H04B 10/116; H04W 4/02
USPC ........................................................... 398/118
See application file for complete search history.

(56) References Cited

U.S. PATENT DOCUMENTS

| 9,600,983 B1* | 3/2017 | Lydecker ................. G08B 5/36 |
| 2014/0247346 A1 | 9/2014 | Bozarth et al. |
| 2015/0280821 A1 | 10/2015 | Breuer et al. |
| 2015/0281905 A1* | 10/2015 | Breuer ................. H04W 4/026 398/118 |
| 2016/0004376 A1* | 1/2016 | Mitsunaga ............ G06F 1/1684 345/173 |
| 2017/0219684 A1* | 8/2017 | Jovicic .................. G01S 5/0289 342/463 |

FOREIGN PATENT DOCUMENTS

| WO | 2015148556 A2 | 10/2015 |
| WO | 2015148694 A1 | 10/2015 |

* cited by examiner

*Primary Examiner* — Dalzid Singh
(74) *Attorney, Agent, or Firm* — Hunter Clark PLLC

(57) ABSTRACT

Disclosed are methods, systems, devices, apparatus, computer readable media, and other implementations, including a method to determine a location of a mobile device that includes determining a physical state of the mobile device, with the mobile device including multiple light-capture devices, selecting at least one of the multiple light-capture devices of the mobile device based, at least in part, on the determined physical state of the mobile device, capturing at least one image, comprising at least one Visual Light Communication (VLC)-capable light device, with the selected at least one of the multiple light-capture devices, decoding at least part of an identifier of the at least one VLC-capable light device, and determining the location of the mobile device based, at least in part, on the identifier of the at least one VLC-capable light device.

30 Claims, 11 Drawing Sheets

000000# CONTROLLABLE SELECTION OF LIGHT-CAPTURE DEVICES

BACKGROUND

Visual Light Communication (VLC) is a technology in which light sources/devices (e.g., LED light fixtures) transmit data (e.g., identifiers, positioning signals, etc.) using modulation of light. A VLC fixture/device may also be utilized to provide illumination. Light signals are typically received by mobile devices (e.g., smartphones) via their built-in camera or image sensors (typically, mobile devices are equipped with at least one camera, such as the front-facing camera positioned at the rear surface of the device), and can be used to compute the device's position in the venue.

VLC-based positioning may utilize line-of-sight between the light device, transmitting a light signal, and the mobile device to obtain extra positioning accuracy. When a user holds the mobile device in his/her hand and is performing navigation operations, the active camera(s) may not, depending on, for example, the device's relative orientation, have an adequate view of the light device, resulting in possible failure of positioning functionality and/or failure of light-based data receipt functionality.

SUMMARY

In some variations, a method to determine a location of a mobile device is provided that includes determining a physical state of the mobile device, with the mobile device including multiple light-capture devices, selecting at least one of the multiple light-capture devices of the mobile device based, at least in part, on the determined physical state of the mobile device, capturing at least one image, comprising at least one Visual Light Communication (VLC)-capable light device, with the selected at least one of the multiple light-capture devices, decoding at least part of an identifier of the at least one VLC-capable light device, and determining the location of the mobile device based, at least in part, on the identifier of the at least one VLC-capable light device.

Embodiments of the method may include at least some of the features described in the present disclosure, including one or more of the following features.

Determining the physical state of the mobile device may include determining, for example, orientation of the mobile device and/or motion of the mobile device.

Determining the physical state of the mobile device may include determining relative physical state of the mobile device, including, for example, respective number of light devices viewable from at least some of the multiple light-capture devices, distance of the respective light devices viewable from the at least some of the multiple light-capture devices to the mobile device, and/or relative orientation of the mobile device to the respective light devices viewable from the at least some of the multiple light-capture devices.

Determining the relative physical state of the mobile device may include performing scans by the at least some of the multiple light-capture devices of respective areas viewable from the at least some of the multiple light-capture devices.

Selecting the at least one of the multiple light-capture devices of the mobile device may include selecting the at least one of the multiple light-capture devices of the mobile device based further on, for example, a current orientation of the mobile device, or the current orientation of the mobile device with a current location estimate for the mobile device and location approximations for one or more light devices configured to transmit light-based communications.

Selecting the at least one of the multiple light-capture devices of the mobile device may include selecting the at least one of the multiple light-capture devices based further on respective light signal levels for respective light-based communications detected by one or more of the multiple light-capture devices.

Selecting the at least one of the multiple light-capture devices of the mobile device may include determining a change of the physical state of the mobile device, determining that an inactive light capture device is likely to be more directly facing the at least one VLC-capable light than a currently active light-capture device from the multiple light-capture devices, activating the more directly facing light capture device, comparing at least one received image measured at the currently active light-capture device to an other at least one received image measured at the more directly facing light capture device, and de-activating the currently activate light-capture device.

The method may further include causing at least one other light-capture device to be active in response to determining whether the more directly facing light capture device detects fewer than a minimum number of light devices.

The method may further include determining an indication of detected light for the currently activate light-capture device and the more directly facing light-capture device light signal level, the indication of detected light including, for example, light signal levels of light signals detected by each of the currently active light-capture device and the more directly facing light-capture device, and/or field of view for light devices from each of the currently active and the more directly facing light-capture device. The method may further include selecting for operation the currently active light-capture device, or the more directly facing light-capture device, or both, based on the indication of detected light.

The multiple light-capture devices may include a first light-capture device located on a front surface of the mobile device, with the front surface of the mobile device further including a visual display, and a second light-capture device disposed on a rear surface of the mobile device substantially opposite the front surface of the mobile device.

The multiple light-capture devices may further include at least one edge light-capture device disposed on an edge surface located between the front surface and the rear surface of the mobile device.

Selecting the at least one of the multiple light-capture devices may include selecting the at least one edge light-capture device of the mobile device in response to a further determination that respective light signal levels of light-based communication signals received through the first light-capture device and the second light-capture device are below a pre-determined low threshold, or above a pre-determined over-exposure threshold.

Selecting the at least one of the multiple light-capture devices of the mobile device may include selecting the second light-capture device, disposed on the rear surface of the mobile device substantially opposite the front surface of the mobile device, in response to a determination of receipt of a voice call at the mobile device, and a further determination, based on the physical state of the mobile device, of displacement of the mobile device in a direction towards a head of a user.

Determining the physical state of the mobile device comprises determining that the mobile device is substantially vertical, and wherein selecting the at least one of the multiple light-capture devices may include selecting a top light-capture device, disposed on a top edge surface of the mobile device, in response to a determination that the mobile device is substantially vertical.

The physical state of the mobile device may include current orientation data for the mobile device and prior orientation data, and selecting the at least one of the multiple light-capture devices may include selecting the at least one of the multiple light capture devices based further on light signal levels received at an earlier time instance, when the mobile device was at a first orientation, from one or more light devices configured to transmit one or more light-based communications, and based on a current, second, orientation for the mobile device.

Selecting the at least one of the multiple light-capture devices may include selecting the at least one of the multiple light capture devices based further on light signal levels received at an earlier time instance, when the mobile device was at a first location estimate, from one or more light devices configured to transmit one or more light-based communications, and based on a current, second, location estimate for the mobile device. Decoding the at least part of the identifier of the at least one VLC-capable light device may include identifying from the captured image at least one time-domain signal representative of one or more symbols comprising at least part of at least one VLC codeword encoded in a received at least one VLC signal, and determining the at least one VLC codeword, based at least in part upon the at least one time-domain signal identified from the captured at least part of the at least one image.

The at least one of the multiple light-capture devices may include a digital light sensor with rolling shutter capability.

In some variations, a mobile device is provided that includes one or more orientation sensors configured to obtain measurements relating to a physical state of the mobile device, multiple light-capture devices, memory to store computer instructions, and one or more processors coupled to the memory, the one or more orientation sensors, and the multiple light-capture devices. The one or more processors are configured to determine the physical state of the mobile device based, at least in part, the measurements obtained by the one or more orientation sensors, and select at least one of the multiple light-capture devices of the mobile device based, at least in part, on the determined physical state of the mobile device. The selected at least one of the multiple light-capture devices is configured to capture at least one image comprising at least one Visual Light Communication (VLC)-capable light device. The one or more processors are further configured to decode at least part of an identifier of the at least one VLC-capable light device, and determine the location of the mobile device based, at least in part, on the identifier of the at least one VLC-capable light device.

In some variations, an apparatus is provided that includes means for determining a physical state of the mobile device, with the mobile device in including multiple light-capture devices, means for selecting at least one of the multiple light-capture devices of the mobile device based, at least in part, on the determined physical state of the mobile device, means for capturing at least one image, comprising at least one Visual Light Communication (VLC)-capable light device, with the selected at least one of the multiple light-capture devices, means for decoding at least part of an identifier of the at least one VLC-capable light device, and means for determining the location of the mobile device based, at least in part, on the identifier of the at least one VLC-capable light device.

In some variation, a non-transitory computer readable media is provided, that is programmed with instructions, executable on a processor, to determine a physical state of a mobile device, with the mobile device including multiple light-capture devices, select at least one of the multiple light-capture devices of the mobile device based, at least in part, on the determined physical state of the mobile device, capture at least one image, comprising at least one Visual Light Communication (VLC)-capable light device, with the selected at least one of the multiple light-capture devices, decode at least part of an identifier of the at least one VLC-capable light device, and determine the location of the mobile device based, at least in part, on the identifier of the at least one VLC-capable light device Embodiments of the mobile device, the apparatus, and the non-transitory computer readable media may include at least some of the features described in the present disclosure, including at least some of the features described above in relation to the method.

Other and further objects, features, aspects, and advantages of the present disclosure will become better understood with the following detailed description of the accompanying drawings.

BRIEF DESCRIPTION OF THE DRAWINGS

Like reference symbols in the various drawings indicate like elements.

DETAILED DESCRIPTION

Figure 1:
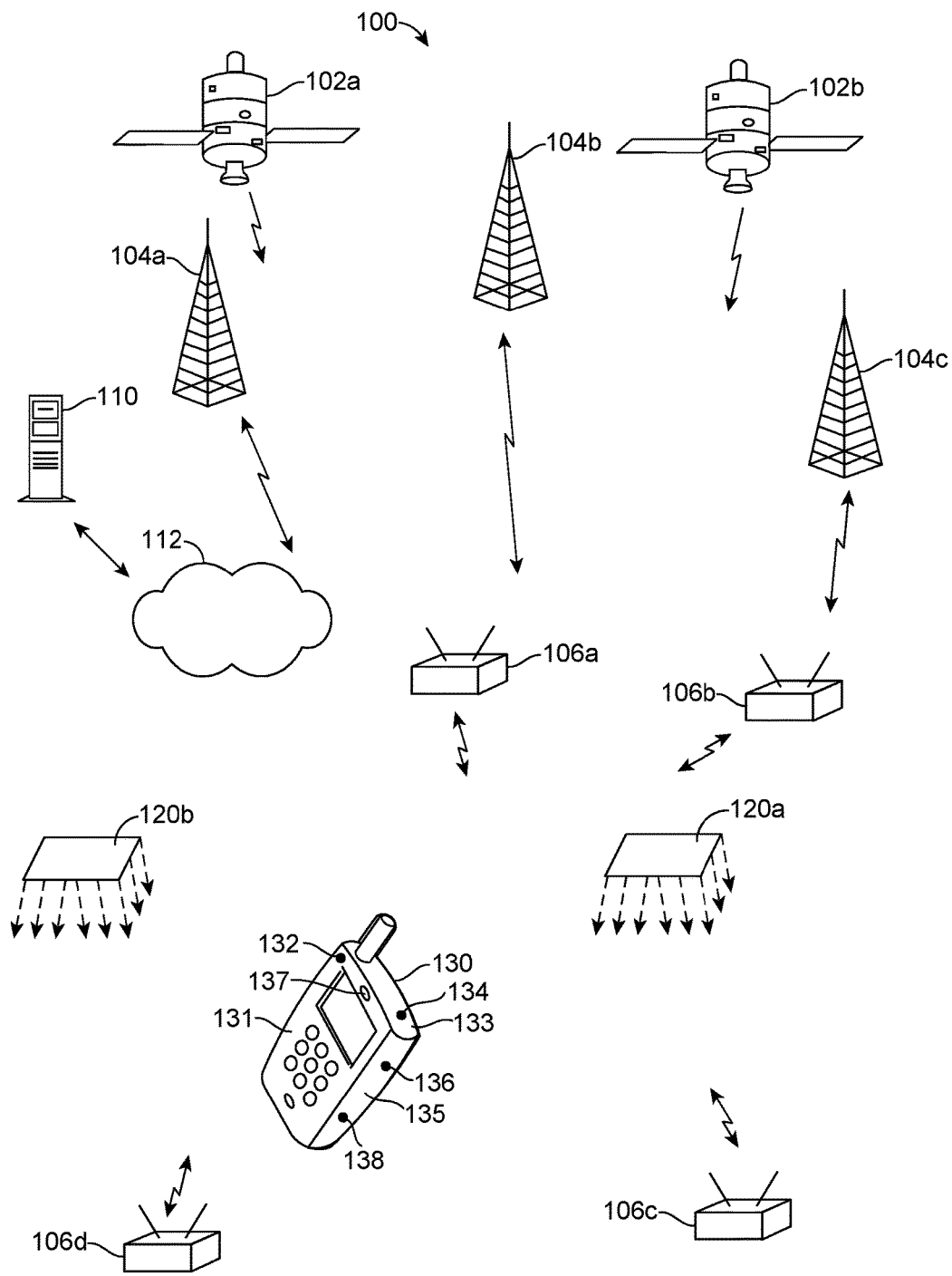
FIG. 1 is a diagram of an example operating environment that includes a wireless mobile device.

Described herein are methods, systems, devices, apparatus, computer-/processor-readable media, and other implementations to determine location of a processor-based mobile device that include a method including determining a physical state (e.g., orientation and/or motion, determined using, for example, inertial sensors) of a mobile device that includes multiple light-capture devices (e.g., multiple camera or other light sensors), selecting at least one of the multiple light-capture devices of the mobile device based, at least in part, on the determined physical state of the mobile device, capturing at least one image, comprising at least one Visual Light Communication (VLC)-capable light device, with the selected at least one of the multiple light-capture devices, decoding at least part of an identifier of the at least one VLC-capable light device, and determining the location of the mobile device based, at least in part, on the identifier of the at least one VLC-capable light device.

In some embodiments, the multiple light-capture devices of the mobile device may include, for example a first-light capture device disposed at a front surface of the mobile device on which a speaker and a microphone are further disposed (i.e., a camera positioned to face the user when the user is looking at the screen of the mobile device), a second light-capture device disposed on a rear surface of the mobile device substantially opposite the front surface of the mobile device, and/or at least one third, edge, light-capture device disposed on an edge surface of the mobile device located between the front surface and the rear surface of the mobile device (e.g., the top edge surface). Other cameras/light-sensor devices may also be included with the mobile device. As will be discussed in greater detail below, in some embodiments, the decision-making process of selecting which light-capture device is to be selected/activated may be based on additional information, such as current usage of the mobile device (e.g., whether there is an incoming voice call), light-signal level, from light sources detected by the light-capture devices, location information for the mobile devices and/or for the light sources, etc. For example, in some embodiments, selecting the at least one of the multiple light-capture devices of the mobile device may include selecting the second light-capture device (e.g., disposed on the rear-surface) in response to a determination of receipt, or origination, of a voice call at the mobile device, and a further determination, based on the physical state of the mobile device, of displacement of the mobile device in a direction towards a head of a user (e.g., with the front surface of the mobile device, including the speaker and the microphone, being closer to the user than the rear surface, or, in some situations, with the rear surface being closer to the ear). Thus, if there an alert for the an incoming voice call, or the user is taking action to respond to, or originate, a call (as indicated by the orientation and motion for the device, which may indicate the user moving the mobile device towards his/her ear), the camera at the rear surface of the mobile device may be selected, while the camera at the front surface is not selected (or de-activated, if that camera has been in an ON state) because that camera, on the front surface of the mobile device, will be obstructed by the user's head. In another example, selecting the at least one of the multiple light-capture devices may include selecting the at least one of the multiple light capture devices based further on light-signal levels received at an earlier time instance, when the mobile device was at a first location estimate, from one or more light sources emitting corresponding one or more light-based communications, and based on a current, second, location estimate for the mobile device. In that example, because the location (approximate or exact) of the light devices (which are generally stationary) relative to a first location of a mobile device is known (e.g., based, at least in part, on the light-signal level received at that first location), when the mobile device moves to a second location, the relative location of the light devices to the second location of the mobile device can be determined.

With reference to FIG. 1, a diagram of an example operating environment 100 that includes a wireless mobile device 130, configured to perform operations to facilitate determination of the mobile device's location, is shown. The wireless device 130 may be configured to communicate according to one or more communication protocols (e.g., near-field protocols, such as Bluetooth® wireless technology or ZigBee, WLAN protocols, such as a WiFi protocol according to IEEE 802.11k standard, WWAN protocols, etc.) The device 130 may be configured, in some embodiments, to determine a physical state (including orientation data and/or motion date) of the mobile device (using, for example, inertial sensors), select at least one of multiple light-capture devices (e.g., the cameras 132, 134, 136, 137, and 138) of the mobile device in order to capture images from one or more scenes, based, at least in part, on the determined physical state of the mobile device, capture at least part of at least one image comprising at least one light device (a VLC-capable light device, such as the light devices 120a-b) configured to emit/transmit at least one light-based communication (also referred to as "light-based encoded communications" or "optical communications"), with the selected at least one of the multiple light-capture devices, decode at least part of an identifier of the at least one light device, and determine the location of the mobile device based, at least in part, on the identifier of the at least one light device. As depicted in the FIG. 1, the mobile device 130 may include multiple light-capture devices such as, for example, a first light-capture device 132 disposed at a front surface 131 of the mobile device on which a speaker and a microphone are further disposed (the camera 132 is the camera that a user would face as he was interacting with the user-interface, e.g., dial-pad, of the mobile device 130), a second light-capture device (not shown) which would ordinarily be disposed on a rear surface of the mobile device substantially opposite the front surface 131 of the mobile device 130 (such a camera is also referred to as front-facing), a third light-capture device 137 (also disposed on the front surface 131), and at least one third, edge (also referred to as "side), light-capture device disposed on edge surfaces of the mobile device located between the front surface and the rear surface of the mobile device (e.g., such as the cameras 134 disposed on a top edge surface 133, and the cameras 136 and 138 disposed on a right side edge surface 135). In some embodiments, a mobile device may be have other camera configurations. For example, in one implementation, the mobile device may have one front facing camera (i.e., on the mobile device's rear surface) and two cameras (dual cameras) on one rear side (e.g., such as the cameras 136 and 138). Any number of cameras and camera configurations for the mobile device may be implemented, including any combination that includes one or more of the light-capture device s 132, 134, 136-138, and the front-facing camera(s) disposed on the rear-surface of the mobile device 130.

The mobile device 130 (as well as any other device depicted in FIG. 1) may be configured to operate and interact with multiple types of other communication systems/devices, including local area network devices (or nodes), such as WLAN for indoor communication, femtocells, Bluetooth® wireless technology-based transceivers, and other types of indoor communication network nodes, wide area wireless network nodes, satellite communication systems, other mobile devices, etc., and as such the mobile device 130 may include one or more interfaces and/or transceivers to communicate with the various types of communications systems. The various devices of FIG. 1 may be configured to establish and operate according to any number of communication protocols.

As noted, the environment 100 may contain one or more different types of wireless communication systems or nodes, each of which may be used to establish communication links with the device 130. The nodes illustrated in FIG. 1 include wireless access points (or WAPs) and may include LAN and/or WAN wireless transceivers, including, for example, WiFi base stations, femto cell transceivers, Bluetooth® wireless technology transceivers, cellular base stations, WiMax transceivers, etc. Thus, for example, and with continued reference to FIG. 1, the environment 100 may include the Local Area Network Wireless Access Points (LAN-WAPs) 106a-d that may be used for wireless voice and/or data communication with the mobile device 130. The LAN-WAPs 106a-d may also be utilized, in some embodiments, as independent sources of position data, e.g., through fingerprinting-based procedures, through implementation of multilateration-based procedures based, for example, on timing-based techniques (e.g., RTT-based measurements, observed-time-difference-of-arrival, or OTDOA, in which a mobile device measures time differences in received signals from a plurality of network nodes, and so on), signal strength measurements (e.g., RSSI measurements), etc. The LAN-WAPs 106a-d can be part of a Wireless Local Area Network (WLAN), which may operate in buildings and perform communications over smaller geographic regions than a WWAN. Additionally in some embodiments, the LAN-WAPs 106a-d could also include pico or femto cells. In some embodiments, the LAN-WAPs 106a-d may be part of, for example, WiFi networks (802.11x), cellular piconets and/or femtocells, Bluetooth® wireless technology Networks, etc. Although four (34) LAN-WAP's are depicted in FIG. 1, any number of such LAN-WAP's may be used, and, in some embodiments, the environment 100 may include no LAN-WAPs at all, or may include a single LAN-WAP.

As further illustrated, the environment 100 may also include a plurality of one or more types of the Wide Area Network Wireless Access Points (WAN-WAPs) 104a-c, which may be used for wireless voice and/or data communication, and may also serve as another source of independent information through which the mobile wireless device 130 (and/or other devices) may determine its position/location. The WAN-WAPs 104a-c may be part of wide area wireless network (WWAN), which may include cellular base stations, and/or other wide area wireless systems, such as, for example, WiMAX (e.g., 802.16). A WWAN may include other known network components which are not shown in FIG. 1. Typically, each WAN-WAPs 104a-c within the WWAN may operate from fixed positions or may be moveable, and may provide network coverage over large metropolitan and/or regional areas. Although three (3) WAN-WAPs are depicted in FIG. 1, any number of such WAN-WAPs may be used. In some embodiments, the environment 100 may include no WAN-WAPs at all, or may include a single WAN-WAP.

Communication to and from the mobile device 130 (to exchange data, and facilitate location determination operations and other services to the device 130, etc.) may be implemented using various wireless communication networks and/or technologies and/or encodings, such as a wide area wireless network (WWAN), a wireless local area network (WLAN), a wireless personal area network (WPAN), a peer-to-peer network, and so on. The term "network" and "system" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other radio access technology (RAT). GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. In some embodiments, 4G networks, Long Term Evolution ("LTE") networks, Advanced LTE networks, Ultra Mobile Broadband (UMB) networks, and all other types of cellular communications networks may also be implemented and used with the systems, devices methods, and other implementations described herein. A WLAN may also be implemented, at least in part, using an IEEE 802.11x network, and a WPAN may be a Bluetooth® wireless technology network, an IEEE 802.15x, or some other type of network. The techniques described herein may also be used for any combination of WWAN, WLAN and/or WPAN.

In some embodiments, and as further depicted in FIG. 1, the mobile device 130 may also be configured to at least receive information from a Satellite Positioning System (SPS) 102a-b, which may be used as an independent source of position information for the mobile device 130. The mobile device 130 may thus include one or more dedicated SPS receivers configured to receive signals for deriving device geo-location information from the SPS satellites. In embodiments in which the mobile device 130 can receive satellite signals, the mobile device may utilize a receiver (e.g., a GNSS receiver) specifically implemented for use with the SPS to extract position data from a plurality of signals transmitted by at least the SPS satellites 102a-b. Transmitted satellite signals may include, for example, signals marked with a repeating pseudo-random noise (PN) code of a set number of chips and may be located on ground based control stations, user equipment and/or space vehicles. The techniques provided herein may be applied to, or otherwise implemented, for use in various other systems, such as, e.g., Global Positioning System (GPS), Galileo, Glonass, Compass, Quasi-Zenith Satellite System (QZSS) over Japan, Indian Regional Navigational Satellite System (IRNSS) over India, Beidou over China, etc., and/or various augmentation systems (e.g., a Satellite Based Augmentation System (SBAS)) that may be associated with, or otherwise enabled, for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals may include SPS, SPS-like, and/or other signals associated with such one or more SPS.

As further shown in FIG. 1, the system 100 may further include a server 110 (e.g., a location server, such as an Evolved Serving Mobile Location Center (E-SMLC) server, or any other type of server) configured to communicate, via a network 112 (e.g., a cellular wireless network, a WiFi network, a packet-based private or public network, such as the public Internet), or via wireless transceivers included with the server 110, with multiple network elements or nodes, and/or mobile wireless devices. For example, the server 110 may be configured to establish communication links with one or more of the WLAN nodes, such as the access points 106a-d, which may be part of the network 112, to communicate data and/or control signals to those access points, and receive data and/or control signals from the access points. Each of the access points 106a-d can, in turn, establish communication links with mobile devices located within range of the respective access points 106a-d. The server 110 may also be configured to establish communication links (directly via a wireless transceiver(s), or indirectly, via a network connection) with one or more of the WWAN nodes, such as the WWAN access points 104a-c depicted in FIG. 1, which may also be part of the network 112, and/or to establish communication links with mobile wireless devices (such as the device 130), the light devices 120a-b, etc. The server 110 may also be configured to at least receive information from satellite vehicles 102a and/or 102b of a Satellite Positioning System (SPS), which may be used as an independent source of position information. In some embodiments, the server 110 may be part of, attached to, or reachable from network 112, and may communicate with the mobile wireless device 130, or with any other device or node depicted in FIG. 1, including the light devices 120a-b, directly or via some network.

Figure 2:
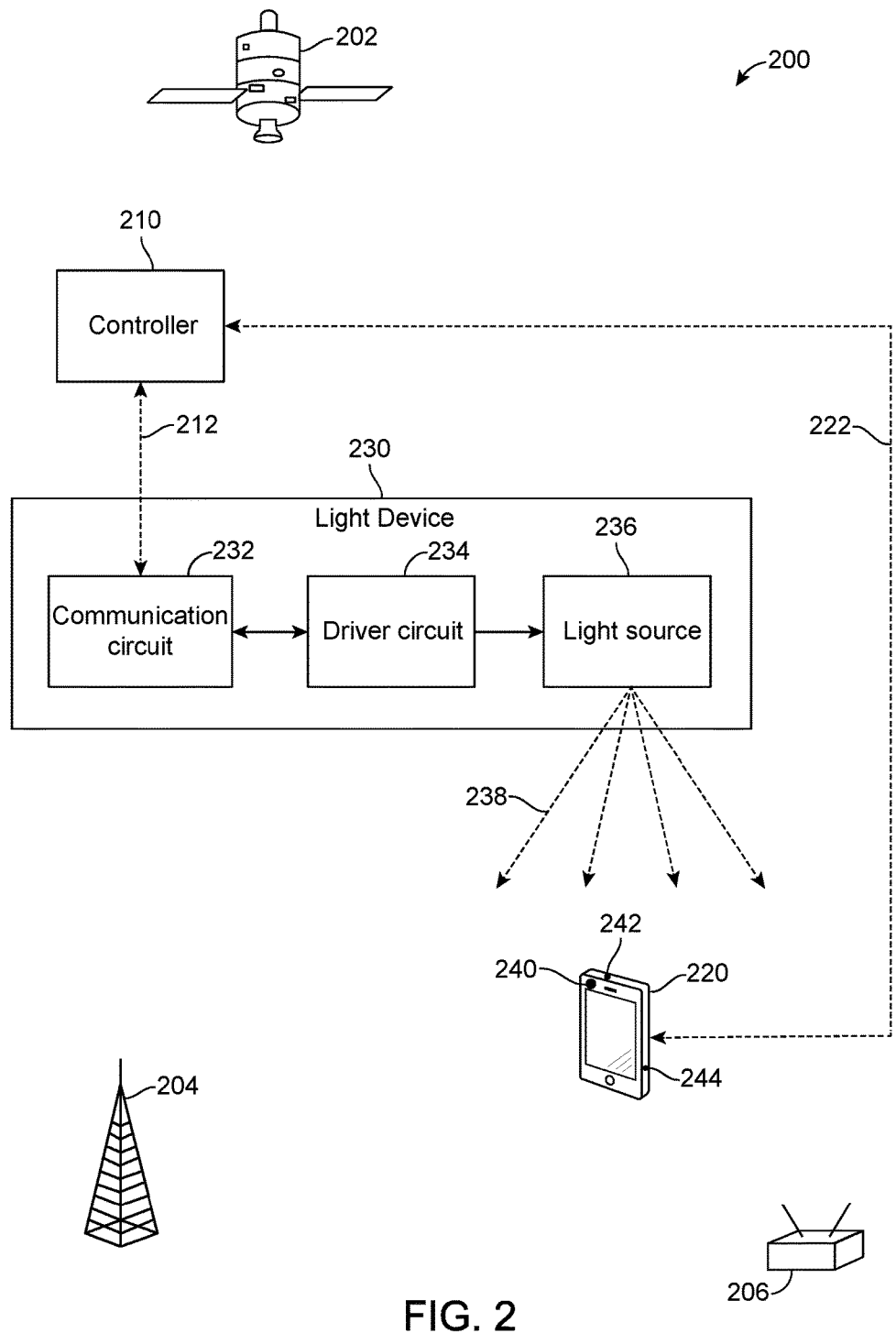
FIG. 2 is a schematic diagram of a light-based communication system.

With reference to FIG. 2, a schematic diagram of an example light-based communication system 200 that can be used to transmit light-based communications (such as VLC signals) is shown. The light-based communication system 200 includes a controller 210 configured to control the operation/functionality of a light device 230 (also referred to as a "light fixture" or a "light source"). The light device 230 (optionally in conjunction with the controller 210) may be similar, in configuration and/or functionality, to the light devices 120a-b schematically depicted in FIG. 1, and thus may be a VLC-capable light device configured to transmit VLC signals. In some embodiments, the light device may be configured to transmit other types (e.g., other technologies or protocols) of light signals. The system 200 further includes a mobile device 220, which may be similar to, in configuration and/or functionality, the mobile device 130 of FIG. 1, and is configured to receive and capture light emissions from a light source of the light device 230 (e.g., using selected ones of multiple light-capture devices or sensors, which may be part of a light-based communication receiver module 512 depicted in FIG. 5), and to decode data encoded in the emitted light from the light device 230. Light emitted by a light source 236 of the light device 230 may be controllably modulated to include sequences of pulses (of fixed or variable durations) corresponding to codewords to be encoded into the emitted light. In some embodiments, visible pulses for codeword frames emitted by the light device 230 are captured by one or more of a light-capture unit 240, 242, 244, and/or other light capture devices (each of which may include at least one lens and a sensor array) of the mobile device 220, and are decoded (e.g., by identifying from the captured at least part of the at least one image a time-domain signal representative of one or more symbols comprising a visual light communication (VLC) codeword encoded in the VLC signal, and determining, at least in part, the VLC codeword from the time-domain signal identified from the captured at least part of the at least one image).

In some embodiments, the light-based communication system 200 may include any number of controllers such as the controller 210, mobile devices, such as the mobile device 220, and/or light devices, such as the light device (fixture) 230. In some embodiments, the mobile device 220 may communicate directly with the light device 230. In some embodiments, the system 200 may be constituted similarly (in configuration and/or functionality) to the environment 100 of FIG. 1.

As further shown in FIG. 2, the light device 230 includes, in some embodiments, a communication circuit 232 to communicate with, for example, the controller 210 (via a link or channel 212, which may be a WiFi link, a link established over a power line, a LAN-based link, etc.), a driver circuit 234, and/or a light source 236. The communication circuit 232 may include one or more transceivers, implemented according to any one or more of communication technologies and protocols, including IEEE 802.11 (WiFI) protocols, near field technologies (e.g., Bluetooth® wireless technology network, ZigBee, etc.), cellular WWAN technologies, etc., and may also be part of a network (a local area network (LAN), a wireless LAN (WLAN), a wide area network (WAN), a wireless WAN (WWAN), etc.) assigned with a unique network address (e.g., an IP address). The communication circuit 232 may be implemented to provide wired communication, and may thus be connected to the controller 210 via a physical communication link. The controller 210 may in turn be a network node in a communication network to enable network-wide communication to and from the light device/fixture 230. In some implementations, the controller may be realized as part of the communication circuit 232. The controller may be configured to set/reset the codeword at each of the light fixtures. A light device/fixture may have a sequence of codewords, and the controller may be configured to provide a control signal to cause the light fixture to cycle through its list of codewords. Alternatively and/or additionally, in some embodiments, light fixtures may be addressable so that a controller (such as the controller 210 of FIG. 2) may access a particular light device/fixture to provide instructions, new code words, light intensity, frequency, and other parameters for any given fixture.

In some examples, the light source 236 may include one or more light emitting diodes (LEDs) and/or other light emitting elements. In some configurations, a single light source or a commonly controlled group of light emitting elements may be provided (e.g., a single light source, such as the light source 236 of FIG. 2, or a commonly controlled group of light emitting elements may be used for ambient illumination and light-based communication transmissions). In other configurations, the light source 236 may be replaced with multiple light sources or separately controlled groups of light emitting elements (e.g., a first light source may be used for ambient illumination, and a second light source may be used to implement coded light-based communication such as VLC signal transmissions).

The driver circuit 234 (e.g., an intelligent ballast) may be configured to drive the light source 236. For example, the driver circuit 234 may be configured to drive the light source 236 using a current signal and/or a voltage signal to cause the light source to emit light modulated to encode information representative of a codeword (or other data) that the light source 236 is to communicate. As such, the driver circuit may be configured to output electrical power according to a pattern that would cause the light source to controllably emit light modulated with a desired codeword (e.g., an identifier). In some implementations, some of the functionality of the driver circuit 234 may be implemented at the controller 210.

By way of example, the controller 210 may be implemented as a processor-based system (e.g., a desktop computer, server, portable computing device or wall-mounted control pad). As noted, at least some of the functionality of the controller 210 may be provided by the mobile device 220. For example, controlling signals to control the driver circuit 234 may be communicated from the mobile device 220 to the controller 210 via, for example, a wireless communication link/channel 222, and the transmitted controlling signals may then be forwarded to the driver circuit 234 via the communication circuit 232 of the fixture 230. In some embodiments, the controller 210 may also be implemented as a switch, such as an ON/OFF/dimming switch. A user may control performance attributes/characteristics for the light fixture 230, e.g., an illumination factor specified as, for example, a percentage of dimness, via the controller 210, which illumination factor may be provided by the controller 210 to the light fixture 230. In some examples, the controller 210 may provide the illumination factor to the communication circuit 232 of the light device 230. By way of example, the illumination factor, or other controlling parameters for the performance behavior of the light fixture and/or communications parameters, timing, identification and/or behavior, may be provided to the communication circuit 232 over a power line network, a wireless local area network (WLAN; e.g., a Wi-Fi network), a wireless wide area network (WWAN; e.g., a cellular network such as a Long Term Evolution (LTE) or LTE-Advanced (LTE-A) network), and/or via a wired network.

In some embodiments, the controller 210 may also provide the light device/fixture 230 with a codeword (e.g., an identifier) for repeated transmission using VLC. The controller 210 may also be configured to receive status information from the light device 230. The status information may include, for example, a light intensity of the light source 236, a thermal performance of the light source 236, and/or the codeword (or identifying information) assigned to the light fixture 230.

The mobile device 220 may be implemented, for example, as a mobile phone or tablet computer, and may be configured to communicate over different access networks, such as other WLANs and/or WWANs and/or personal area networks (PANs). The mobile device may communicate unidirectionally or bi-directionally with the controller 210, and/or with other devices and nodes in the system. As noted, the mobile device 220 may also communicate directly with the light device 230.

When the light device 230 is in an ON state, the light source 236 may provide ambient illumination 238 which may be captured by, for example, one or more of the light-capture devices 240, 242, and 244 disposed on the device 220. Each such light-capture device of the device 220 may include a digital sensor (e.g., digital camera) such as a CMOS camera, a charge-couple device (CCD)-type camera, etc. In some embodiments, the camera may be implemented with a rolling shutter mechanism configured to capture image data from a scene over some time period by scanning the scene vertically or horizontally so that different areas of the captured image correspond to different time instances. The light source 236 may also emit light-based communication transmissions that may be captured by any one of the various light-capture devices. The illumination and/or light-based communication transmissions may be used by the mobile device 220 for navigation and/or other purposes.

As also shown in FIG. 2, the light-based communication system 200 may be configured for communication with one or more different types of wireless communication systems or nodes. Such nodes, also referred to as wireless access points (or WAPs) may include LAN and/or WAN wireless transceivers, including, for example, WiFi base stations, femto cell transceivers, Bluetooth® wireless technology transceivers, cellular base stations, WiMax transceivers, etc. Thus, for example, one or more Local Area Network Wireless Access Points (LAN-WAPs), such as a LAN-WAP 206, which may be similar, in configuration and/or functionality, to any of the LAN-WAP's 106a-d of FIG. 1, may be used to provide wireless voice and/or data communication with the mobile device 220 and/or the light device 230 (e.g., via the controller 210). The light-based communication system 200 may also be configured for communication with one or more Wide Area Network Wireless Access Points, such as a WAN-WAP 204, which may be similar to, in configuration, and/or functionality, to any of the WAN-WAP 104a-c depicted in FIG. 1, and may be used for wireless voice and/or data communication, and may also serve as another source of independent information through which the mobile device 220, for example, may determine its position/location. In some embodiments, any of the controller 210, the mobile device 220, and/or the light device/fixture 230 may also be configured to at least receive information from a Satellite Positioning System (SPS) that includes a satellite 202, which may be similar to, in configuration and/or functionality, to any of the satellites 102a-b of FIG. 1, and which may be used as an independent source of position information for the mobile device 220 (and/or for the controller 210 or the fixture 230).

As noted, in some embodiments, position information may be derived based on data determined from decoding light-based communications provided by the light device 230 (through emissions from light sources such as the light source 236). The mobile device may be configured to determine physical state data (e.g., the mobile device's orientation and/or motion), and select one or more of its multiple light-capture devices based on the determined physical state. In addition to physical state, other information may aid in the selection of the one or more light-capture device, including available location information (e.g., coarse location information, which may have been obtained from received RF signals) for the mobile device, location information for light fixtures in the vicinity of the mobile device, light-signal levels (resulting from emissions from light fixtures) detected/sensed by the mobile device, mobile device usage (e.g., if the mobile device is receiving an incoming call that the user of the device is going to respond to, this will affect which cameras will be obstructed, thus affecting the selection of the cameras that are to be activated to continue receiving light signals). Light captured by the selected light-capture devices can then be used to determine the location (e.g., a relatively precise information) through a process of detecting and decoding light signals encoded into the light emissions from the various light fixtures detected. Light-based communications may also provide other types of data content.

Figure 3:
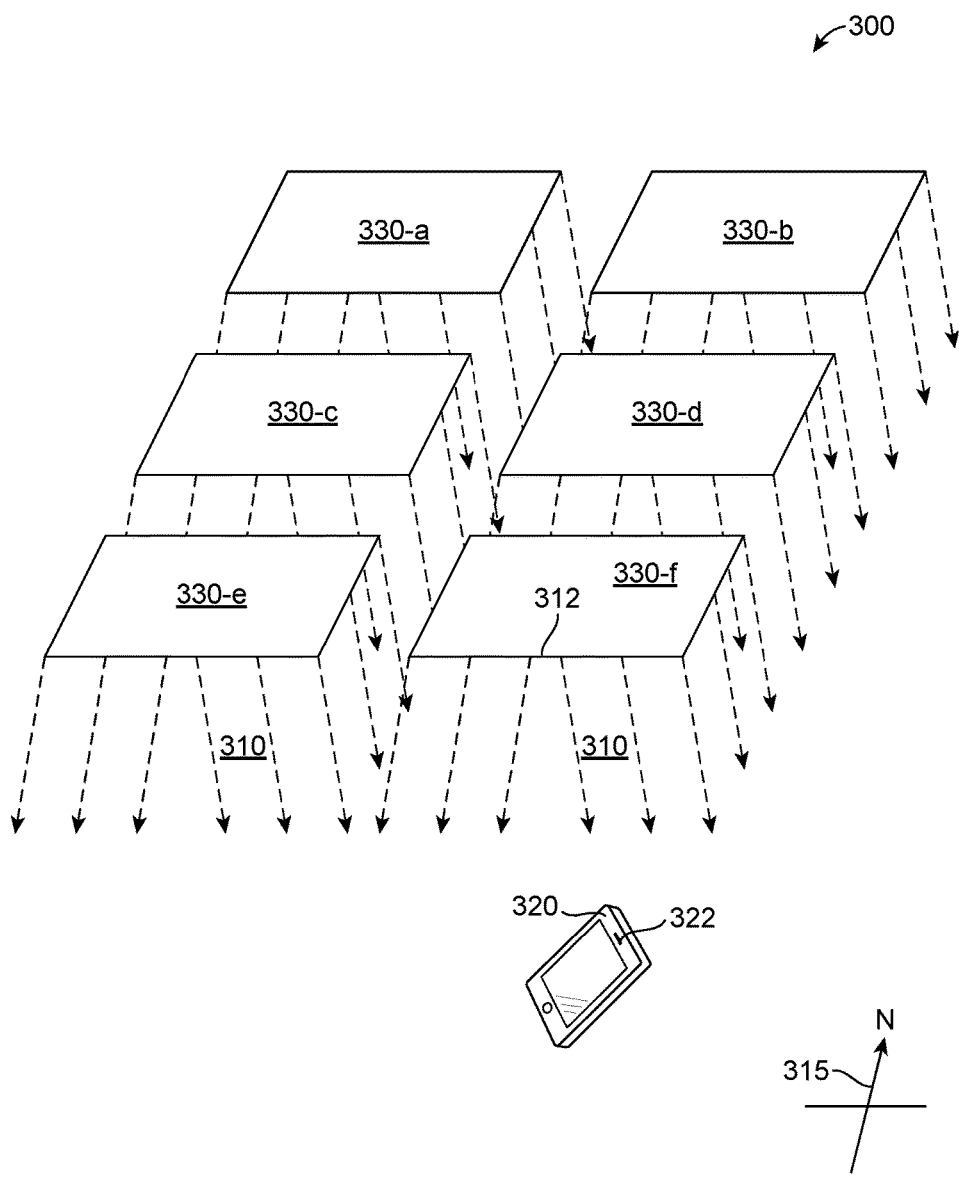
FIG. 3 is a diagram of another light-based communication system with multiple light devices.

With reference now to FIG. 3, a diagram of an example light-based communication system 300 is shown. The system 300 includes a mobile device 320 (which may be similar in configuration and/or functionality to the mobile devices 130 or 220 of FIGS. 1 and 2) positioned near (e.g., below) a number of light devices/fixtures 330-a, 330-b, 330-c, 330-d, 330-e, and 330-f. The light devices 330-a, 330-b, 330-c, 330-d, 330-e, and 330-f may, in some cases, be examples of aspects of the light device 120a-b and/or the light device 230 described with reference to FIGS. 1 and 2. The light devices 330-a, 330-b, 330-c, 330-d, 330-e, and 330-f may, in some examples, be overhead light devices/fixtures in a building (or overhead street/area lighting out of doors), which may have fixed locations with respect to a reference (e.g., a global positioning system (GPS) coordinate system and/or building floor plan). In some embodiments, the light devices 330-a, 330-b, 330-c, 330-d, 330-e, and 330-f may also have fixed orientations with respect to a reference (e.g., a meridian passing through magnetic north 315).

As the mobile device 320 moves (or is moved) under one or more of the light devices/fixtures 330-a, 330-b, 330-c, 330-d, 330-e, and 330-f, one or more light-capture devices of the mobile device 320 (which may include any number of light-capture devices, including front-facing, back-facing, and edge surface cameras, where each such light-capture device may be similar to the light-capture device 240 of FIG. 2), such as the light-capture device 322 (disposed on the front surface of the mobile device 320) may receive light 310 emitted by one or more of the light fixtures 330-a, 330-b, 330-c, 330-d, 330-e, and 330-f and capture an image of part or all of one or more of the light fixtures 330-a, 330-b, 330-c, 330-d, 330-e, and 330-f. Alternatively or additionally, the mobile device 320 may receive, from one or more of the light devices 330-a, 330-b, 330-c, 330-d, 330-e, and 330-f, light-based communication (e.g., VLC signals) transmissions that include codewords (comprising symbols), such as identifiers, of one or more of the light fixtures 330-a, 330-b, 330-c, 330-d, 330-e, and/or 330-f. The received codewords may be used to determine a location of the mobile device 320 with respect to the light devices 330-a, 330-b, 330-c, 330-d, 330-e, and 330-f, and/or to look up locations of one or more of the light devices 330-a, 330-b, 330-c, 330-d, 330-e, and 330-f and determine, for example, a location of the mobile device 320 with respect to a coordinate system and/or building floor plan. In some implementations, location determination may be based on determined angles-of-arrival of light signals from various ones of the light devices, and based further on the locations of the light devices associated with the codewords/identifiers decoded from light signals those light devices transmit. Additionally or alternatively, the mobile device 320 may use the locations of one or more of the light fixtures 330-a, 330-b, 330-c, 330-d, 330-e, and 330-f, along with captured images (and known or measured dimensions and/or captured images of features, such as corners or edges) of the light devices 330-a, 330-b, 330-c, 330-d, 330-e, and 330-f, to determine a more precise location and/or orientation of the mobile device 320. Upon determining the location of the mobile device 320, the location may be used for navigation by the mobile device 320. Alternatively and/or additionally, the captured image(s) may include an illuminated reference axis, such as the illuminated edge 312 of the light fixture 330-f. Such illuminated edges may facilitate the mobile device to determine its location and/or orientation with reference to one or more of the light devices 330-a, 330-b, 330-c, 330-d, 330-e, and 330-f.

Figure 4:
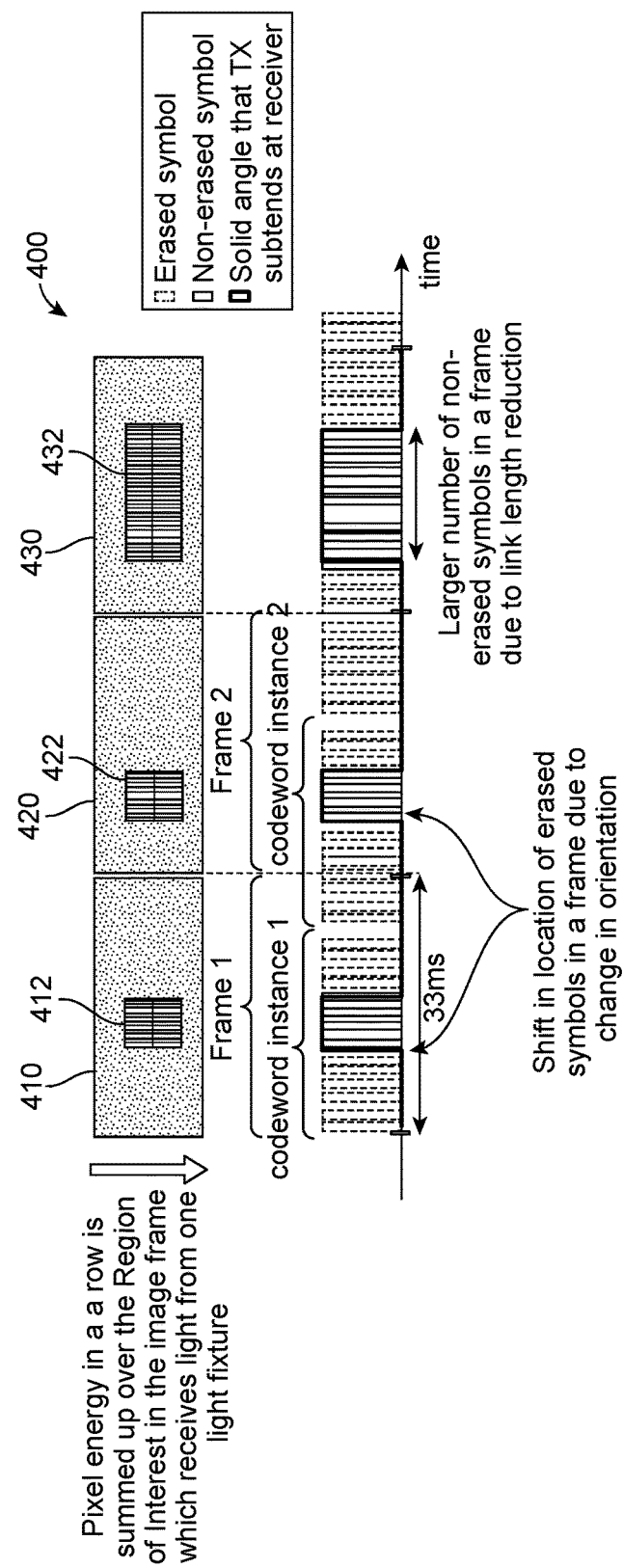
FIG. 4 is a diagram illustrating captured images, over three separate frames, of a scene that includes a light device emitting a coded light-based message.

As noted, a receiving device (e.g., a mobile phone, such as the devices 130, 220, or 320 of FIGS. 1-3, or some other mobile device) uses its light-capture devices, which may be equipped with a gradual-exposure module(s)/circuit(s) (e.g., a rolling shutter) to capture a portion of, or all of, a transmission frame of the light source (during which part of, or all of, a codeword the light source is configured to communicate is transmitted). A light-capture device employing a rolling shutter, or another type of gradual-exposure mechanism, captures an image (or part of an image) over some predetermined time interval such that different rows in the frame are captured at different times, with the time associated with the first row of the image and the time associated with the last row of the image defining a frame period. In embodiments in which the mobile device is not stationary, the portion of a captured image corresponding to the light emitted from the light source will generally vary. For example, with reference to FIG. 4, a diagram 400 illustrating captured images, over three separate frames, of a scene that includes a light source emitting a light-based communication (e.g., a VLC signal), is shown. Because the receiving device's spatial relationship relative to the light source varies over the three frames (e.g., because the device's distance to the light source is changing, and/or because the device's orientation relative to the light source is changing, etc.), the region of interest in each captured image will also vary. In the example of FIG. 4, variation in the size and position of the region of interest in each of the illustrated captured frames may be due to a change in the orientation of the receiving device's light-capture device relative to the light source (the light source is generally stationary). Thus, for example, in a first captured frame 410 the light-capture device of the receiving device is at a first orientation (e.g., angle and distance) relative to the light source so that the light-capture device can capture a region of interest, corresponding to the light source, with first dimensions 412 (e.g., size and/or position). At a subsequent time interval, corresponding to a second transmission frame for the light source (during which the same codeword may be communicated), the receiving device has changed its orientation relative to the light source, and, consequently, the receiving device's light-capture device captures a second image frame 420 in which the region of interest corresponding to the light source has second dimensions 422 (e.g., size and/or a position) different from the first dimensions of the region of interest in the first frame 410. During a third time interval, in which the receiving device may again have changed its orientation relative to the light source, a third image frame 430, that includes a region of interest corresponding to the light source, is captured, with the region of interest including third dimensions 432 that are different (e.g., due to the change in orientation of the receiving device and its light-capture device relative to the light source) from the second dimensions.

Figure 5:
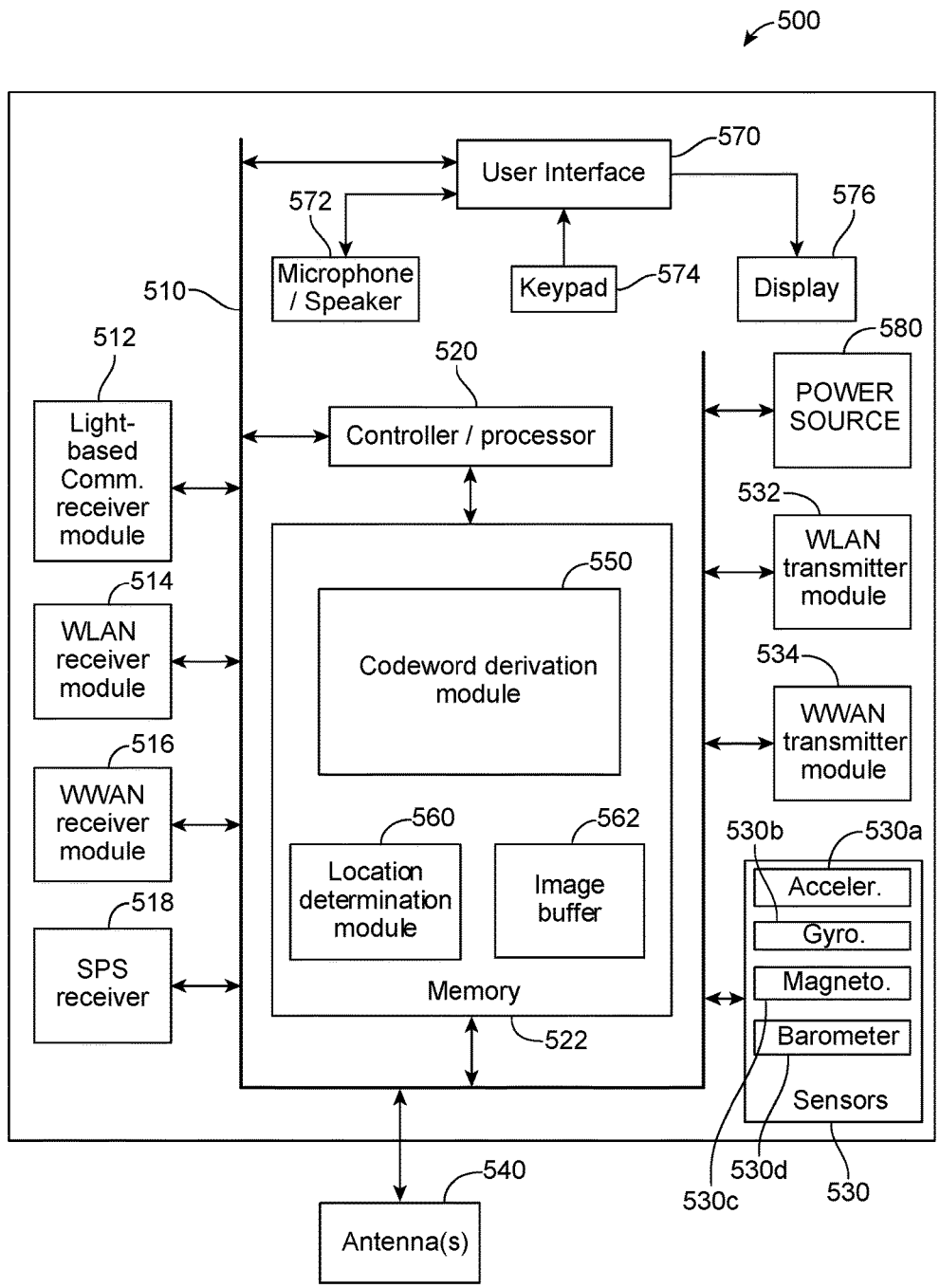
FIG. 5 is a block diagram of a device configured to controllably select at least one of multiple light-capture devices of the device.

With reference now to FIG. 5, a block diagram of an example device 500 (e.g., a mobile device, such as a cellular phone, that includes multiple cameras) configured to controllably select at least one of multiple light-capture devices (e.g., cameras) of the device to improve detection of light-based signals so as to facilitate, for example, location determination operations, is shown. The device 500 may be similar in implementation and/or functionality to the devices 130, 220 or 320 of FIGS. 1-3. For the sake of simplicity, the various features/components/functions illustrated in the schematic boxes of FIG. 5 are connected together using a common bus 510 to represent that these various features/components/functions are operatively coupled together. Other connections, mechanisms, features, functions, or the like, may be provided and adapted as necessary to operatively couple and configure a portable wireless device. Furthermore, one or more of the features or functions illustrated in the example of FIG. 5 may be further subdivided, or two or more of the features or functions illustrated in FIG. 5 may be combined. Additionally, one or more of the features, components, or functions illustrated in FIG. 5 may be excluded. In some embodiments, some or all of the components depicted in FIG. 5 may also be used in implementations of one or more of the light devices (e.g. the devices 120*a-b* of FIG. 1, the device 230 with or without the controller 210 depicted in FIG. 2), or may be used with any other device or node described herein.

As noted, in some embodiments, an assigned codeword, encoded into repeating light-based communications transmitted by a light device (e.g., via the light source 236 of the light device 230 of FIG. 2) may include, for example, an identifier codeword to identify the light device (the light device may be associated with location information, and thus, identifying the light device may facilitate position determination for the receiving device) or may include other types of information (which may be encoded using other types of encoding schemes). As shown, in some implementations, the device 500 may include receiver modules, a controller/processor module 520 to execute application modules (e.g., software-implemented modules stored in a memory storage device 522), and/or transmitter modules. Each of these components may be in communication (e.g., electrical communication) with each other. The components/units/modules of the device 500 may, individually or collectively, be implemented using one or more application-specific integrated circuits (ASICs) adapted to perform some or all of the applicable functions in hardware. Alternatively and/or additionally, functions of the device 500 may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs). The functions of each unit may also be implemented, in whole or in part, with instructions embodied in a memory, formatted to be executed by one or more general or application-specific processors. The device 500 may have any of various configurations, and may in some cases be, or include, a cellular device (e.g., a smartphone), a computer (e.g., a tablet computer), a wearable device (e.g., a watch or electronic glasses), a module or assembly associated with a vehicle or robotic machine (e.g., a module or assembly associated with a forklift, a vacuum cleaner, a car, etc.), and so on. In some embodiments, the device 500 may have an internal power supply (not shown), such as a small battery, to facilitate mobile operation. Further details about an example implementation of a processor-based device which may be used to realize, at least in part, the system 1000, is provided below with respect to FIG. 10.

As further shown in FIG. 5, the receiver modules may include a light-based communication receiver module 512, which may include multiple light-capture devices similar to the light-capture devices 132, 134, and/or 136 of FIG. 1, or the light-capture devices 240, 242, and/244 of FIG. 2, configured to receive a light-based communication such as a VLC signal (e.g., from a light source such as the light source 236 of FIG. 2, or from light sources of any of the light devices 120*a-b* or 330-*a-f* depicted in FIGS. 1 and 3). As discussed, the various light captured devices of the device 500 may be disposed on any of the different surfaces and locations of the housing of the mobile device (e.g., front-surface, rear-surface, any of edge-surfaces of a device such as the mobile devices 130 and 220 of FIGS. 1 and 2) so that, depending on, for example, the orientation, motion and other germane information for the device, these light capture devices can be controllably selected and activated in a manner that would improve light data detection, by the mobile device, of light devices/sources transmitting light-based data (e.g., if one camera is being turned away from a light source transmitting light-based data, another light-capture device that may be turning towards that light source can be activated). As discussed herein, in some embodiments, several ones of the light-capture device may be simultaneously activated so as to receive light-based data from several light sources, or to improve signal reception by the mobile device of light signals emitted from a particular light source. In some embodiments, the lens of the light-capture device (more than one lens may be included in some light-capture devices) may be a fixed-focus lens (e.g., for use with cameras installed in vehicles to facilitate driving and/or to implement vehicle safety systems), while in some embodiments, the lens may be a variable focus lens. The light-based communication receiver module 512 may also include a photo detector (PD) or array of PDs, e.g., a complementary metal-oxide-semiconductor (CMOS) image sensor (e.g., camera), a charge couple device, or some other sensor-based camera. The light-based communication receiver module 512 may be implemented as a gradual-exposure light-capture device, e.g., a rolling shutter image sensor. In such embodiments, the image sensor captures an image over some predetermined time interval such that different rows in the frame are captured at different times. The light-based communication receiver module 512 may be used to receive, for example, one or more VLC signals in which one or more identifiers, or other information, are encoded. An image captured by the light-based communication receiver module 512 may be stored in a buffer such as an image buffer 562 which may be a part of a memory storage device 522 schematically illustrated in FIG. 5.

Additional receiver modules/circuits that may be used instead of, or in addition to, the light-based communication receiver module 512 may include one or more radio frequency (RF) receiver modules/circuits/controllers that are connected to one or more antennas 540. As noted, RF signals received and measured through such RF modules may facilitate position determination which may be used to estimate positioning of the mobile device. For example, the RF signals may be used to obtain a coarse position, which can be used to facilitate a more precise position by, for example, causing selection of cameras on the mobile device that may be determined to point at potential sources of light located within the area corresponding to the determined coarse position. In some embodiments, the device 500 may include a wireless local area network (WLAN) receiver module 514 configured to enable, for example, communication according to IEEE 802.11x (e.g., a WiFi receiver). In some embodiments, the WLAN receiver 514 may be configured to communicate with other types of local area networks, personal area networks (e.g., Bluetooth® wireless technology networks, or other types of near-field networks), etc. Other types of wireless networking technologies may also be used including, for example, Ultra Wide Band, ZigBee, wireless USB, etc. In some embodiments, the device 500 may also include a wireless wide area network (WWAN) receiver module 516 comprising suitable devices, hardware, and/or software for communicating with and/or detecting signals from one or more of, for example, WWAN access points and/or directly with other wireless devices within a network. In some implementations, the WWAN receiver may comprise a CDMA communication system suitable for communicating with a CDMA network of wireless base stations. In some implementations, the WWAN receiver module 516 may facilitate communication with other types of cellular telephony networks, such as, for example, TDMA, GSM, WCDMA, LTE, etc. Additionally, any other type of wireless networking technologies may be used, including, for example, WiMax (802.16), etc. In some embodiments, an SPS receiver 518 (also referred to as a global navigation satellite system (GNSS) receiver) may also be included with the device 500. The SPS receiver 518, as well as the WLAN receiver module 514 and the WWAN receiver module 516, may be connected to the one or more antennas 540 for receiving RF signals. The SPS receiver 518 may comprise any suitable hardware and/or software for receiving and processing SPS signals. The SPS receiver 518 may request information as appropriate from other systems, and may perform computations necessary to determine the position of the mobile device 500 using, in part, measurements obtained through any suitable SPS procedure.

In some embodiments, the device 500 may also include one or more sensors 530 such as an accelerometer 530a, a gyroscope 530b, a geomagnetic (magnetometer) sensor (e.g., a compass) 530c, any of which may be implemented based on micro-electro-mechanical-system (MEMS), or based on some other technology. Directional sensors such as accelerometers and/or magnetometers may, in some embodiments, be used to determine the device orientation relative to a light fixture(s), and/or used to select between multiple light-capture devices (e.g., of the light-based communication receiver module 512). Additionally, such sensors may be used, in some embodiments, to obtain an exact or approximate measure of speed/velocity and/or distance traveled by the mobile device between two locations, based on which subsequent predicted selection/activation of the one or more of the multiple light-capture devices may be performed. Other sensors that may be included with the device 500 may include an altimeter (e.g., a barometric pressure altimeter 530d), a thermometer (e.g., a thermistor; not shown), an audio sensor (e.g., a microphone; not shown) and/or other sensors. The output of the sensors may be provided as part of the data based on which operations, such as location determination and/or navigation operations, may be performed.

In some examples, the device 500 may include one or more RF transmitter modules connected to the antennas 540, and may include one or more of, for example, a WLAN transmitter module 532 (e.g., a Wi-Fi transmitter module, a Bluetooth® wireless technology networks transmitter module, and/or a transmitter module to enable communication with any other type of local or near-field networking environment), a WWAN transmitter module 534 (e.g., a cellular transmitter module such as an LTE/LTE-A transmitter module), etc. The WLAN transmitter module 532 and/or the WWAN transmitter module 534 may be used to transmit, for example, various types of data and/or control signals (e.g., to the controller 210 connected to the light device 230 of FIG. 2) over one or more communication links of a wireless communication system. In some embodiments, the transmitter modules and receiver modules may be implemented as part of the same module (e.g., a transceiver module), while in some embodiments the transmitter modules and the receiver modules may each be implemented as dedicated independent modules.

The controller/processor module 520 is configured to manage various functions and operations related to light-based communication and/or RF communication, including decoding light-based communications, such as VLC signals. As shown, in some embodiments, the controller 520 may be in communication (e.g., directly or via the bus 510) with the memory storage device 522 which includes a codeword derivation module 550. As illustrated in FIG. 5, an image captured by any of the light-capture devices (e.g., of the light-based communication receiver module 512 of FIG. 5) may be stored in the image buffer 562, and processing operations performed by the codeword derivation module 550 may be performed on the data of the captured image stored in the image buffer 562. In some embodiments, codeword derivation module 550 may be implemented as a hardware realization, a software realization (e.g., as processor-executable code stored on non-transitory storage medium such as volatile or non-volatile memory, which in FIG. 5 is depicted as the memory storage device 522), or as a hybrid hardware-software realization. The controller 520 may be implemented as a general processor-based realization, or as a customized processor realization, to execute the instructions stored on the memory storage device 522. In some embodiments, the controller 520 may be realized as an apps processor, a DSP processor, a modem processor, dedicated hardware logic, or any combination thereof. Where implemented, at least in part, based on software, each of the modules, depicted in FIG. 5 as being stored on the memory storage device 522, may be stored on a separate RAM memory module, a ROM memory module, an EEPROM memory module, a CD-ROM, a FLASH memory module, a Subscriber Identity Module (SIM) memory, or any other type of memory/storage device, implemented through any appropriate technology. The memory storage device 522 may also be implemented directly in hardware.

In some embodiments, the controller/processor 520 may also include a location determination engine/module 560 to determine a location of the device 500 or a location of a device that transmitted a light-based communication (e.g., a location of a light source such as the light source 236 and/or the light device 230 depicted in FIG. 2) based, for example, on a codeword (identifier) encoded in a light-based communication transmitted by the light source. For example, in such embodiments, each of the codewords of a codebook may be associated with a corresponding location (provided through data records, which may be maintained at a remote server, or be downloaded to the device 500, associating codewords with locations). In some examples, the location determination module 560 may be used to determine the locations of a plurality of devices (light sources and/or their respective fixtures) that transmit light-based communications, and determine the location of the device 500 based at least in part on the determined locations of the plurality of devices. In some implementations, the location determination module 560 may obtain position information from various other receivers and modules of the mobile device 500, e.g., based on receive signal strength indication (RSSI) and round trip time (RTT) measurements performed using, for example, the radio frequency receiver and transmitter modules of the device 500, as well as based on angle of arrival of RF signals at the receiving device.

Figure 6A:
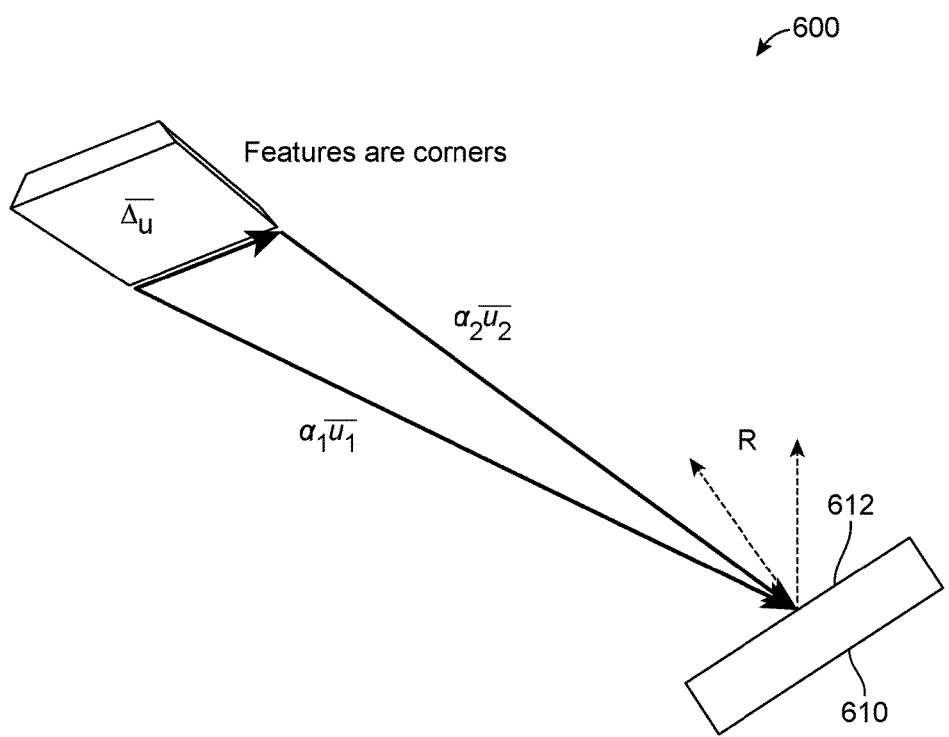
FIG. 6A is a diagram of a system to determine position of a device.
Figure 6B:
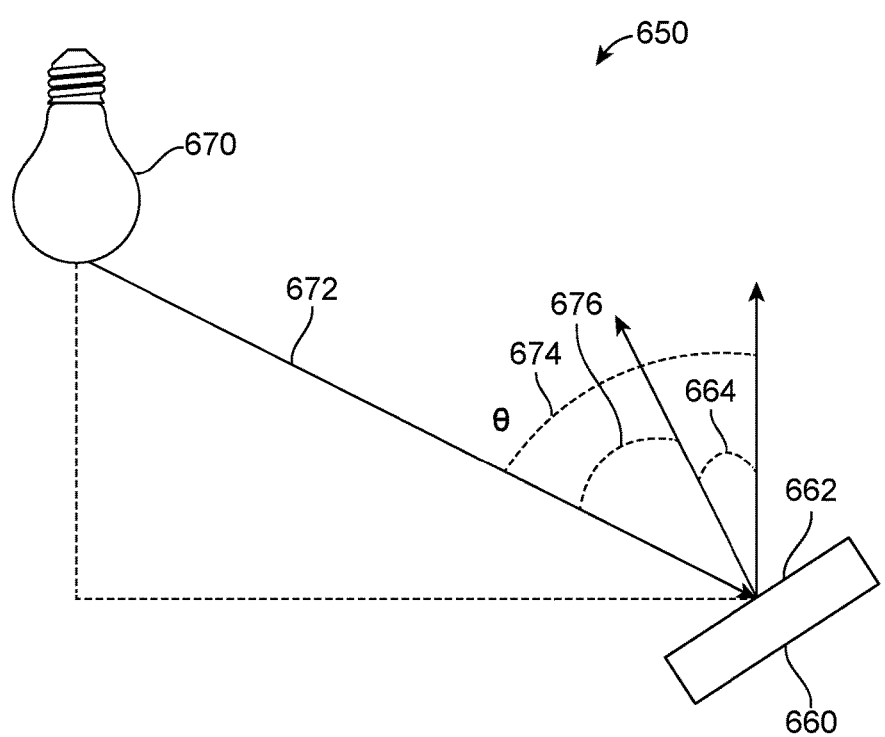
FIG. 6B is a diagram of a system to determine angle of arrival of a light signal.

In some embodiments, location determination based on light-based communications (using codewords/identifiers decoded from such light-based communications) may be based on physical features such as corners/edges of a light/device fixture to achieve 'cm' level accuracy in determining the position of the mobile device (as more particularly discussed below in relation to FIG. 6A), and/or may be based on angle of arrival of the light-based signal (in which, as more particularly described in relation to FIG. 6B, the mobile device determines a position by making use of its camera to capture a light device's VLC signals, decode the light device ID, and measure the angle of arrival (AOA) of the VLC signal from that light device). In some embodiments, based on the angle of arrival of light-based signals, and using assistance data, the mobile device can obtain decoded light devices' ID's (and thus determine their positions) and determine its position (e.g., using trilateration techniques).

Thus, for example, and with reference to FIG. 6A showing a diagram of an example system 600 to determine position of a device 610 (e.g., a mobile device which may be similar to the mobile devices 130, 220, 320, or 500 of FIGS. 1, 2, 3, and 5, respectively) that includes a light-capture device 612 (which may be one of multiple light-capture devices of the device 610), consider a situation where an image is obtained from which two corners of a light source of the light device (e.g., a light device transmitting a light-based communication identifying that light device, with that light device being associated with a known position) are visible and are detected. In this situation, the direction of arrival of light rays corresponding to each of the identified corners of the light fixture are represented as a unit vector $u'_1$ and $u'_2$ in the device's coordinate system. In some embodiments, based on measurements from the mobile device's various sensors (e.g., measurements from an accelerometer, a gyroscope, a geomagnetic sensor, each of which may be part of the sensors 530 of the device 500 of FIG. 5), the tilt of the mobile device may be derived/measured, and based on that the rotation matrix R of the device's coordinate system around that of the earth may be derived. The position and orientation of the device may then be derived based on the known locations of the two identified features (e.g., corner features of the identified fixture) by solving for the parameters $\alpha_1$ and $\alpha_2$ in the relationship:

$$\alpha_1 u'_1 + \alpha_2 u'_2 = R^{-1} \Delta'_u,$$

where $\Delta'_u$ is the vector connecting the two known features. The determined location for the mobile device may include position coordinates (absolute or relative), and may also include an orientation value (e.g., the azimuth or elevation angle) of the light-capture device with respect to the light device that transmitted the light-based communication.

A location of the mobile device may also be derived based on an angle-of-arrival of a light signal (e.g., corresponding to a light-based communication). In such embodiments, a location approximation for the mobile device may be derived, for example, by using the mobile device's activated light-capture devices to capture VLC signals of light devices appearing in the capture scene(s), decoding the light devices' ID's, and measuring the angle of arrival (AOA) of the VLC signals from those light devices. Using assistance data, the mobile device (or a location server) can determine the positions of the light devices according to the VLC-decoded ID's, and compute (e.g., using a trilateration process) the mobile device's position. FIG. 6B shows a diagram of an example system 650 to determine an angle of arrival of a light signal and determine position of a device 660 (e.g., a mobile device which may be similar to the mobile devices 130, 220, 320, 500, or 610 of FIGS. 1, 2, 3, 5, and 6A respectively) based on the determined angle-of-arrival. Consider a situation where modulated light emitted from a light source 670 arrives at some angle θ (marked 674) relative to some external frame-of-reference (e.g., the earth's frame-of-reference). As shown in FIG. 6B, the device 660 is tilted in some undetermined angle relative to that external frame-of-reference.

In some embodiments, determination of the angle of arrival of a light signal 672 from the light source 670 may include determining the relative angle of arrival of the signal 672 with respect to a coordinate system of the mobile device 660. The relative angle of arrival of the light signal 672 may be estimated, in some cases, by determining a position of an illuminated region captured by an image sensor (of a light-capture device 662) of the device 660 illuminated by the light source 670. The illuminated region may be defined as an array of pixels within the image sensor, and may in some cases be specified in terms of pixel indices. A centroid of the illuminated region (e.g., a location $(x_0,y_0)$), may be found relative to the image sensor's coordinate system, which may also be considered the coordinate system of the mobile device 660. The image sensor's coordinate system may be defined by a pair of axes centered at the midway pixel along the width and the length of the image sensor. For example, if the sensor is 480 pixels wide and 640 pixels long, then the coordinate axes are centered at the pixel index pair (240, 320). If the centroid of the identified region of the image is at pixel indices (250, 335) then the location of the region is given by $(x_0,y_0)=(10,15)$. In general, if the pixel indices are $(p_x,p_y)$ and the center of the sensor is at pixel indices $(c_x,c_y)$, the location of the region is $(x_0,y_0)=(p_x,p_y)-(c_x,c_y)$. A pair of angles $(\omega_x,\omega_y)$ may then be determined as a function of the centroid $(x_0,y_0)$. This pair of angles determines the angle of arrival of the light signal 672 received by the mobile device 660 (i.e., by the light-capture device 662 of the device 660), expressed in terms of the coordinate system of the mobile device 660, which is a three dimensional coordinate system where the axis perpendicular to the plane that the mobile device lies in is the Z-axis, and the X and Y axes span the plane that the mobile device lies in and coincide with the image sensor's coordinate axes. For example, if the half of the field of view angle is denoted by $\theta_{half}$ and the screen resolution in pixels is denoted by $X_{res}$ by $Y_{res}$, then the mapping between the centroid $(x_0,y_0)$ and the relative angle of arrival $(\omega_x,\omega_y)$ of a light signal may be given by the equations:

$$\omega_x = \arctan\left(\frac{2x_0}{X_{res}} \tan(\theta_{half})\right)$$

$$\omega_y = \arctan\left(\frac{2y_0}{Y_{res}} \tan(\theta_{half})\right)$$

In some embodiments, measurements of an orientation of the mobile device 660 may be obtained from orientation sensors of the device 660 (e.g., a gyroscope, an accelerometer, etc., such as the various sensors 530a-c depicted in FIG. 5). Based on measurements obtained by the orientation sensors of the device 660, a pair of angles $(\theta_x,\theta_y)$ are derived which represent the angles of rotation (or orientation) of the mobile device 660 with respect to the reference (absolute) coordinate system. For example, if gyroscope or accelerometer sensors are used, the angles $(\theta_x,\theta_y)$ may represent the pitch and roll of the mobile device relative to the earth's coordinate system. The absolute angle of arrival (i.e., relative to the reference/external coordinate system) may thus be computed, in some cases, by adjusting the relative angle of arrival (marked with reference numeral 676) with the orientation angle as measured by a the orientation sensors of the device 660.

In some embodiments, the absolute angle of arrival may be determined by multiplying a unit vector, expressed relative to a coordinate system of the mobile device, by a rotation matrix to obtain a unit vector expressed relative to an absolute coordinate system (e.g., the earth's coordinate system). For example, a unit vector in the mobile device's coordinate system may be expressed as:

$$u_{device} = \frac{u_{device}}{|v|}$$

where $v=[\tan(\omega_x), \tan(\omega_y), 1]$, and $|v|=\tan(\omega_x)^2+\tan(\omega_y)^2+1$. The unit vector, u, extends from the mobile device to the light source 670 expressed in the coordinate system of the mobile device, as defined above. From the unit vector (that is expressed in the coordinate system of the mobile device), a resultant unit vector that is expressed in an absolute coordinate system may be obtained. For example, the earth's coordinate system (an absolute coordinate system) may be defined by a Z axis that is parallel to the gravity vector, and X and Y axes that are in the plane of the earth's surface. The relative orientation of the X and Y axes in that plane may be arbitrary or be aligned with the earth's magnetic field. To convert the unit vector u from the coordinate system of the mobile device to the earth's coordinate system, the vector u may be multiplied by a rotation matrix. The rotation matrix may represent the rotation of the mobile device around some axis in the earth's coordinate system. For example, a rotation of the mobile device amounting to $\theta_x$ degrees around the Y axis of the earth's coordinate system (referred to as the roll) may be represented as:

$$R_Y(\theta_x) = \begin{bmatrix} 1 & 0 & 0 \\ 0 & \cos(\theta_x) & -\sin(\theta_x) \\ 0 & \sin(\theta_x) & \cos(\theta_x) \end{bmatrix}$$

The roll angle $\theta_x$ is illustrated in FIG. 6B as an angle 664. A rotation of $\theta_y$ degrees around the X axis of the earth's coordinate system (referred to as the pitch) may be represented as:

$$R_X(\theta_y) = \begin{bmatrix} \cos(\theta_y) & 0 & \sin(\theta_y) \\ 0 & 1 & 0 \\ -\sin(\theta_y) & 0 & \cos(\theta_y) \end{bmatrix}$$

The unit vector in the earth's coordinate system can then be expressed as:

$$u_{earth} = R_Y(\theta_x)R_X(\theta_y)u_{device}$$

Given the unit vector in the earth's coordinate system, $u_{earth}$, a vector from the light source 670 to the mobile device, $u_{earth}$, can be computed by scaling $u_{earth}$ so that the z-coordinate of the resulting vector is equal to the height of the light source from the mobile device. In other words, if $u_{earth}(z)$ is the z-coordinate of vector $u_{earth}$ and $d_z$ is the height, then the vector $u_{earth}$ may be written as:

$$v_{earth} = \frac{d_z u_{earth}}{u_{earth}(z)}$$

Thus, the position of the mobile device can be derived based on the computed angle of arrival of light signals (such as the signal 672) arriving from the light device/fixture 670, and the known position of the light source 670 (i.e., coordinates of the light source in the global frame of reference, such as the earth's global coordinate systems, including height of the light source). As noted, the light device's coordinates may be obtained based, in part, according to the decoded identifier derived from the data included in the modulated light signal received by the light-capture device 662 of the mobile device 660.

Turning back to FIG. 5, in some examples, the device 500 and/or the controller/processor module 520 may include a navigation module (not shown) that uses a determined location of the device 500 (e.g., as determined based on the known locations of one or more light sources/fixtures transmitting the VLC signals) to implement navigation functionality.

A light-based communication (such as a VLC signal) transmitted from a particular light source, is received by the light-based communication receiver module 512, which may include one or more image sensors (e.g., digital cameras) with a gradual-exposure mechanisms (e.g., a CMOS image sensor with a rolling shutter) configured to capture on a single frame time-dependent image data representative of a scene (a scene that includes one or more light devices transmitting light-based communications, such as VLC signals) over some predetermined interval (e.g., the captured scene may correspond to image data captured over 1/30 second), such that different rows contain image data from the same scene but for different times during the predetermined interval. As further noted, the captured image data may be stored in an image buffer which may be realized as a dedicated memory module of the light-based communication receiver module 512, or may be realized on the memory 522 of the device 500. A portion of the captured image will correspond to data representative of the light-based communication transmitted by the particular light source (e.g., the light source 236 of FIG. 2, with the light source comprising, for example, one or more LEDs) in the scene, with a size of that portion based on, for example, the distance and orientation of the light-based communication receiver module to the light source in the scene. In some situations, the light-based communication may be captured at a low exposure setting of the light-based communication receiver module 512, so that high frequency pulses are not attenuated.

Having captured an image frame that includes time-dependent data from a scene including a particular light device (or multiple light devices), the codeword derivation module 550, for example, is configured to process the captured image frame to extract symbols encoded in the light-based communication occupying a portion of the captured image (as noted, the size of the portion will depend on the distance from the light device, and/or on the orientation of the light-based communication receiver module relative to the light device). The symbols extracted may represent at least a portion of the codeword (e.g., an identifier) encoded into the light-based communication, or may represent some other type of information. In some situations, the symbols extracted may include sequential (e.g., consecutive) symbols of the codeword, while in some situations the sequences of symbols may include at least two non-consecutive sub-sequences of the symbols from a single instance of the codeword, or may include symbol sub-sequences from two transmission frames (which may or may not be adjacent frames) of the light source (i.e., from separate instances of a repeating light-based communication).

As also illustrated in FIG. 5, the device 500 may further include a user interface 570 providing suitable interface systems, such as a microphone/speaker 572, a keypad 574, and a display 576 that allows user interaction with the device 500. The microphone/speaker 572 provides for voice communication services (e.g., using the wide area network and/or local area network receiver and transmitter modules).

The keypad 574 may comprise suitable buttons for user input. The display 576 may include a suitable display, such as, for example, a backlit LCD display, and may further include a touch screen display for additional user input modes. As further schematically depicted in FIG. 5, the device 500 also includes power source 580 such as a battery and/or a power conversion module that receives and regulates power from an outside source (e.g., AC power)

Figure 7:
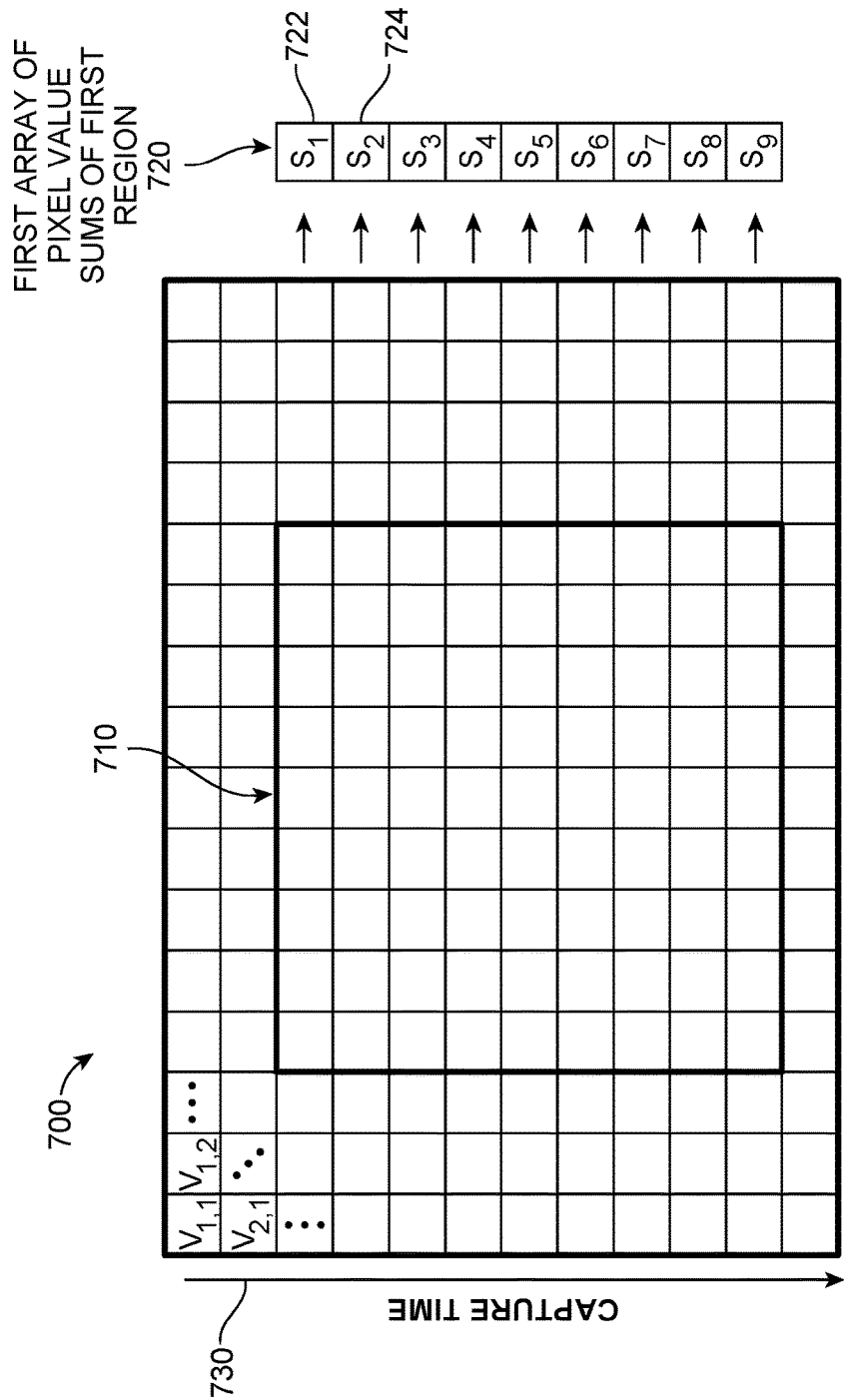
FIG. 7 is an illustration of an image, captured by a sensor array, that includes regions of interest corresponding to a light-based communication transmitted by a light device.

In some embodiments, decoding the symbols from a light-based communication may include determining pixel brightness values from a region of interest in at least one image (the region of interest being a portion of the image corresponding to the light source illumination), and/or determining timing information associated with the decoded symbols. Determination of pixel values, based on which symbols encoded into the light-based communication (e.g., VLC signal) can be identified/decoded, is described in relation to FIG. 7 showing a diagram of an example image 700, captured by an image sensor array (such as that found in one or more of the multiple light-capture devices of the light-based communication receiver module 512), that includes a region of interest 710 corresponding to illumination from a light source. In the example illustration of FIG. 7, the image sensor captures an image using an image sensor array of 192 pixels which is represented by 12 rows and 16 columns. Other implementations may use any other image sensor array size (e.g., 307,200 pixels, represented by 480 rows and 640 columns), depending on the desired resolution and on cost considerations. As shown, the region of interest 710 in the example image 700 is visible during a first frame time. In some embodiments, the region of interest may be identified/detected using image processing techniques (e.g., edge detection processes) to identify areas in the captured image frame with particular characteristics, e.g., a rectangular area with rows of pixels of substantially uniform values. For the identified region of interest 710, an array 720 of pixel sum values is generated. Vertical axis 730 corresponds to capture time; and the rolling shutter implementation in the light-capture device results in different rows of pixels corresponding to different times.

Each pixel in the image 700 captured by the image sensor array includes a pixel value representing energy recovered corresponding to that pixel during exposure. For example, the pixel of row 1 and column 1 has pixel value $V_{1,1}$. As noted, the region of interest 710 is an identified region of the image 700 in which the light-based communication is visible during the first frame. In some embodiments, the region of interest is identified based on comparing individual pixel values, e.g., an individual pixel luma value, to a threshold and identifying pixels with values which exceed the threshold, e.g., in a contiguous rectangular region in the image sensor. In some embodiments, the threshold may be 50% the average luma value of the image 700. In some embodiments, the threshold may be dynamically adjusted, e.g., in response to a failure to identify a first region or a failure to successfully decode information being communicated by a light-based communication in the region 710.

The pixel sum values array 720 is populated with values corresponding to sum of pixel values in each row of the identified region of interest 710. Each element of the array 720 may correspond to a different row of the region of interest 710. For example, array element $S_1$ 722 represents the sum of pixel values (in the example image 700) of the first row of the region of interest 710 (which is the third row of the image 700), and thus includes the value that is the sum of $V_{3,4}$, $V_{3,5}$, $V_{3,6}$, $V_{3,7}$, $V_{3,8}$, $V_{3,9}$, $V_{3,10}$, $V_{3,11}$, and $V_{3,12}$. Similarly, the array element $S_2$ 724 represents the sum of pixel values of the second row of the region of interest 710 (which is row 4 of the image 700) of $V_{4,4}$, $V_{4,5}$, $V_{4,6}$, $V_{4,7}$, $V_{4,8}$, $V_{4,9}$, $V_{4,10}$, $V_{4,11}$, and $V_{4,12}$.

Array element 722 and array element 724 correspond to different sample times as the rolling shutter advances. The array 720 is used to recover a light-based communication (e.g., VLC signal) being communicated. In some embodiments, the VLC signal being communicated is a signal tone, e.g., one particular frequency in a set of predetermined alternative frequencies, during the first frame, and the single tone corresponds to a particular bit pattern in accordance with known predetermined tone-to-symbol mapping information. Decoded symbols encoded into a light-based communication captured by the light-capture device (and appearing in the region of interest of the captured image) may be determined based, in some embodiments, on the computed values of the sum of pixel values (as provided by, for example, the array 720 shown in FIG. 7). For example, the computed sum values of each row of the region of interest may be compared to some threshold value, and in response to a determination that the sum value exceeds the threshold value (or that the sum is within some range of values), the particular row may be deemed to correspond to part of a pulse of a symbol. In some embodiments, the pulse's timing information, e.g., its duration (which, in some embodiments, would be associated with one of the symbols, and thus can be used to decode/identify the symbols from the captured images) may also be determined and recorded. A determination that a particular pulse has ended may be made if there is a drop (e.g., exceeding some threshold) in the pixel sum value from one row to another. Additionally, in some embodiments, a pulse may be determined to have ended only if there are a certain number of consecutive rows (e.g., 2, 3 or more), following a row with a pixel sum that indicates the row is part of a pulse, that are below a non-pulse threshold (that threshold may be different from the threshold, or value range, used to determine that a row is part of a pulse). The number of consecutive rows required to determine that the current pulse has ended may be based on the size of the region of interest. For example, small regions of interest (in situations where the mobile device may be relatively far from the light source) may require fewer consecutive rows below the non-pulse threshold, than the number of rows required for a larger region of interest, in order to determine that the current pulse in the light-based communication signal has ended. Having decoded one or more symbol sub-sequences for the particular codeword, in some embodiments, the codeword derivation module 550 is applied to the one or more decoded symbols in order to determine/identify codewords. The decoding procedures implemented depend on the particular coding scheme used to encode data in the light-based communication.

As described herein, to receive light-based communication (be it identifiers, based on which location determination and navigation operations may be performed, or other types of data) requires that a light-capture device capturing the light-based signal have a direct line of sight to the light source. If the field of view for that light-capture device (the field-of-view, or FOV, may be defined as the portion of the sensor array, of the light-capture device, that is sensing the light-based signal) become partially or wholly obstructed, then, in the implementations described herein, another of the mobile device's cameras, which may have a line-of-sight to the light source, and may thus have a field-of-view to the light source, may be selected and/or activated.

Figure 8:
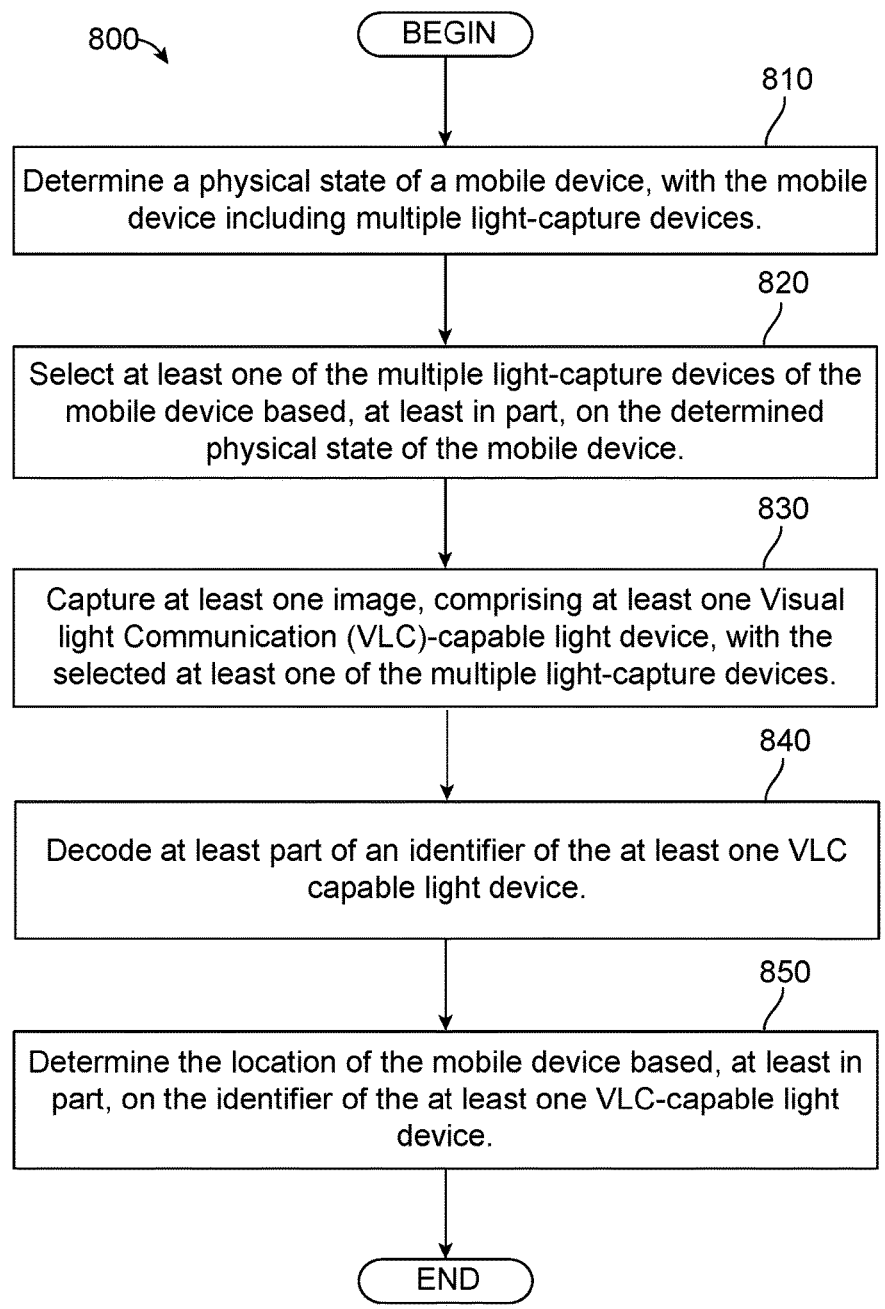
FIG. 8 is a flowchart of a procedure to determine location of a mobile device through controllable selection/activation of at least one of multiple light-capture devices of the mobile device.

Thus, with reference now to FIG. 8, a flowchart of an example procedure 800 for controllable selection of light-capture devices of a processor-based mobile device (such as the mobile devices 130, 220, 320, or 500 of FIG. 1, 2, 3, or 5) based, at least in part, on light-based communication(s) received from one or more light devices (such as the light devices 120*a-b,* 230, or 330*a-f* of FIGS. 1-3) is shown. The example procedure 800 is generally performed at the processor-based mobile device (although at least some operations may be performed at a remote server, such as the server 110 of FIG. 1) and includes determining 810 a physical state of a mobile device that includes multiple light-capture devices. As noted, the mobile device may include one or more front-facing cameras (e.g., a camera that, when a user holds the mobile device aloft and views the screen, the front-facing camera would be on the back/rear surface, opposite the surface that includes the screen, a microphone, and/or a speaker), one or more back-facing cameras (generally disposed on the same front-surface as the screen/interface of the mobile device, such as the cameras 132 and 137 of FIG. 1), and/or one or more edge-surface cameras (e.g., disposed on edge surfaces, such as the top edge surface or the side edge surfaces of the mobile device, that are defined between the front and rear surfaces, with the edge-surface cameras including, for example, the camera 134, 136, and 138 depicted in FIG. 1). The physical state of the mobile device may include such information as the orientation of the device, and/or the motion of the device. In some embodiments, the orientation and/or motion of the mobile device may be determined based, at least in part, on measurements from direction/inertial sensors of the mobile device, such as an accelerometer, gyroscope, and/or a magnetometer (as also described in relation to FIG. 5). For example, the orientation of the mobile device may be determined using an accelerometer to determine the direction of gravity (e.g., when the receiver is stationary, and the only force acting on it is gravity). Because, in such embodiments, the position/orientation of the accelerometer relative to some fixed feature of the mobile device (e.g., some defined axis of the housing of the mobile device) is known, the direction of gravity relative to that feature of the mobile device can be derived. Alternatively and/or additionally, in some embodiments, the orientation of the mobile device may be derived/determined based on measurements from other types of sensing devices, such as magnetometers, gyroscopes, etc., as well as based on image data captured by one or more of the mobile device's light-capture devices. For example, one or more of the mobile device's light capture devices may be used to determine an angle of arrival of a light signal from a light device viewable from the mobile device (as described in relation to FIG. 6B). Because the spatial location and orientation of the light device are known, the location and/or orientation of the mobile device may be derived. Thus, based on measurements from which the relative orientation of the devices can be derived, and based further on the known spatial relationship of the sensing devices (be it an inertial sensing device, a light-capture device, etc.) to the mobile device to which these sensing devices are coupled or are housed in, the orientation of the mobile device (e.g., relative to an external frame of reference that may also be used to represent the positions and orientation of the various light devices transmitting the light-based signals that are to be detected by the mobile device) may be derived/determined.

The measurements from the mobile device's various inertial/orientation sensors may also be used to compute movement/motion for the mobile device. In some embodiments, movement of the mobile device may be derived based on positioning operations determined based on RF signals. For example, sequential positions of the mobile device may be derived based on RF signals received from satellite and/or terrestrial nodes (e.g., wireless WWAN or WLAN access points, satellite vehicles, etc.) The sequential positions at sequential time instances define motion of the mobile device during the interval between the sequential time instances. The motion data may constitute part of the physical state data for the mobile device, based on which, as will be described below, selection of light-capture devices (e.g., cameras) may be performed.

In some embodiments, the physical state data may also include relative location and orientation of the mobile device to near-by light devices (i.e., the number of light devices that are viewable by each light-capture device, the mobile device's distance from, and/or orientation relative to, one or more of the near-by light devices, etc.) Determination of the relative location and orientation of the mobile device may be performed by, for example, activating (e.g., at some predetermined time instance, or periodically at regular or irregular intervals) at least some of the various multiple light-capture devices of the mobile device (simultaneously or according to some activation order), and scanning the area(s) viewable by the activated light-capture device(s) to identify light devices or fixtures that are viewable from those light-capture devices. During such scans, the light signal levels received from light devices viewable by a particular light-capture device may be computed. Such computed light signal levels may be based on a comparison of the light levels (measured by pixels on a sensor array for a particular light capture device) to background light levels, to thus determine relative light signal levels. For example, on a sensor array, a region of pixels which receives light from light fixtures/devices will generally be more brightly illuminated relative to the rest of the pixels. If the more brightly illuminated region is shaped similarly to a field-of-view expected for light received from a light device (e.g., a substantially rectangular or circular field-of-view), then light signal levels for background pixels (e.g., pixels outside the more brightly illuminated field-of-view corresponding to a light device) may be used as a reference light signal level to compare to the light signal levels within the more brightly illuminated area. Upon performance of the scans for the at least some of the light-capture devices, the number of light devices appearing in the views of those light-capture devices, their relative orientations and/or relative distances (as may be inferred according to the size of more brightly illuminated pixel regions in each view), and other such information, can be derived, to thus provide data about current views, and availability of light devices in each such view. Thus, in some embodiments, determining the physical state of the mobile device may include determining relative physical state of the mobile device, including, for example, respective number of light devices viewable from at least some of the multiple light-capture devices, distance of the respective light devices viewable from the at least some of the multiple light-capture devices to the mobile device, and/or relative orientation of the mobile device to the respective light devices viewable from the at least some of the multiple light-capture devices.

Having determined the physical state (e.g., orientation and/or motion of the mobile device), at least one of the multiple light-capture devices of the mobile device is selected 820 based, at least in part, on the determined physical state of the mobile device. The at least one light-capture device, when selected, is used to capture images from one or more scenes. Selection of the at least one light-capture device may be performed to select those light-capture devices facing a scene(s) that include light devices (light fixtures), such as the light devices 120a-b, 230, and/or 330a-f, that transmit light-based signal that include encoded information that may detected by the selected light-capture devices (and subsequently decoded) to thus allow light-based signals to be efficiently collected, even as the physical state of the mobile device (e.g., the mobile device's orientation and/or motion) changes.

For example, in some embodiments, the measured orientation for the mobile device (e.g., as determined by the device's inertial/directional sensors, such as the device's accelerometer which is used to determine the direction of gravity relative to the mobile device) may indicate that the mobile device is substantially vertical, or that the front surface of the mobile device is parallel to a user standing up-right (it is to be noted that such a determination may also be based on visual data or visual cues that may have been obtained by one or more of the light-capture devices, e.g., if the front-surface camera captures an image with a near-by face, it may be determined that the face is of the user holding the phone). A determination that the mobile device is substantially vertical (and/or that front surface of the light-capture device is substantially parallel to the body of a standing person) may indicate that the view of a light device located directly behind the person may be obstructed, and may therefore lead to a determination that other cameras of the mobile device (e.g., the front-facing camera on the rear surface of the mobile device) should be activated to identify possible light devices within those cameras' fields-of-view. In such situations, the light-capture device on the rear surface of the mobile device may be selected/activated. If the light-capture device on the front surface was previously activated, when the orientation of the mobile device is determined to be parallel to the body of the user, the front surface light-capture device may be de-activated (alternatively, it may remain activated so as to capture the scene in the direction where the person is standing in order to obtain light-based signals from any light device situated behind the person, even if the field-of-view for that light-capture device is obstructed). Thus, in some embodiments, determining the physical state of the mobile device may include determining whether the mobile device is substantially vertical (e.g., the longitudinal axis of its front surface, such as the surface 131 illustrated in FIG. 1, is substantially parallel to the direction of gravity), and selecting the at least one of the multiple light-capture devices may include selecting the second light-capture device (e.g., the light-capture device disposed on the rear surface of the mobile device) to capture a second image of a second scene (in a forward direction opposite where the user is located). In some embodiments, a determination of which surface of the mobile is facing, or is pointing, in an upwards direction may be made based on the determined orientation of the mobile device. If there are camera(s) disposed on the surface facing upwards, which are thus likely to have in their field-of-view light devices that are located at high positions (e.g., suspended from ceilings), one or more of such cameras, disposed on the upward facing surface, may be activated. Accordingly, in such embodiments, selection of the at least one light-capture device to activate may be based on determining (based on, for example, the orientation and/or location of the mobile device) which surface is facing upwards (e.g., perpendicularly and away from the direction of gravity).

It is to be noted that many different other examples exist as to how the determined physical state (orientation and/or motion) for the mobile device can be used to select activation of the various light-capture devices disposed on the mobile device. For example, movement of the mobile device, as determined from inertial/directional sensors measurements, may be used to determine hand gestures, or other actions undertaken by the user, which also provide useful indication of which light-capture devices should be selected/activated. For example, an increase in an elevation of the mobile device, and/or other measurements indicating the mobile device is being lifted and/or being brought closer to the user's head, may indicate that the scene that will be viewable from the front-surface camera will include a lot of features of the user's body, and that the background (possibly containing light-sources) may therefore be obstructed to some extent. Thus, based on that determination of the motion and/or orientation of the mobile device, a determination may be made to select other ones of the light-capture devices (e.g., the rear-surface and/or edge-surfaces cameras) in order to search for, and obtain other light-based signals.

In some embodiments, the physical state data that is used to select which of the multiple light-capture devices to select and activate may also be based on previous (historical) physical state data. In some situations, a change of orientation, or mobile device motion, of the light-capture device (e.g., when assessed relative to the previous orientation and/or motion) affects which of the multiple light-capture devices to select. For example, if a previous orientation (e.g., at some earlier time instance, or at the last time instance that the sensor measurements measured a change in orientation or otherwise detected motion) of the mobile device was substantially (e.g., within some threshold error tolerance level) parallel to the user's body, and the front-surface camera was active (e.g., if the user was conducting a video conference), and the user subsequently started tilting the mobile phone at an angle relative to the normal to the surface on which the user is standing (e.g., indicating that the user is trying to point the mobile device upwards), this may be deemed to be an attempt by the user to facilitate searching for a light source, or otherwise using the mobile device to scan the user's surrounding, thus indicating that the rear-surface light-capture device, and possibly one or more of the edge-surfaces light-capture devices, should be selected and activated to facilitate seeking and detecting light-based signals from light devices that may be deployed in the area where the user is located.

As noted, in some embodiments, selecting at least one of the multiple light-capture devices may be based on relative physical state data determined, for example, from scans performed for at least some of the light-capture devices to identify viewable light devices (and/or determine their distance and orientation relative to the respective light-capture devices). For example, in some implementations, the number of identified light devices viewable from each scanned light-capture device may be used to select and activate one or more of those light-capture devices (e.g., selecting and activating the light-capture device corresponding to the largest number of light devices identified in corresponding scans). The selection of light-capture devices may also take into account signal quality. For example, if a first light-capture device is associated with a scan that includes a larger number of identified light devices than the number of light devices viewable from a second light capture device, but the light devices viewable from the first light-capture device are farther away (as may be determined by the size of the pixel regions in the scan corresponding to light devices), the second light capture device, whose scan includes fewer, but possibly stronger and more reliable identified light devices, may be selected. In some examples, the relative light strength corresponding to identified light devices in the scan may also affect the selection and activation of light-capture devices of the mobile device.

In some embodiments, a determination of which of the multiple light-capture devices of the mobile device to select may be further based on additional data other than the physical state of the device. For example, selecting which of the multiple light-capture devices to select may further be based on such data as the mobile device's usage data (e.g., what processes operations are being performed by the mobile device, how the user typically uses the device, etc.), location data (current and previous) for the location of the mobile device and/or locations of the light devices/sources transmitting the light-based signals detected by the mobile device, detected/sensed light-signal levels received from light devices through the various multiple light-capture devices, the number of light devices detectable by activated light-capture devices, etc.

For instance, as noted, in some implementations, determination of which of the multiple light-capture device to select may be based on usage data representative of, for example, current operations performed by the mobile device. For example, when an incoming voice call is received by the mobile device (e.g., via a WWAN receiver module 516), and orientation/motion measurements indicate that the user is displacing the mobile device towards his head (thus indicating that the user is going to answer the call, rather than directing the call to the voice mail system), a determination may be made that any light-based signals that may have been received through the front-surface light-capture device will no longer be detected through that light-capture device. Accordingly, based on usage data, and based also on the measured change in the mobile device orientation of the mobile device, or other physical state data indicating a trajectory of the mobile device (and thus its change in orientation), other ones of the multiple light-capture devices that are to be selected/activated are identified. To illustrate, consider a situation where the front-surface light-capture device was receiving light-based signal from a light source suspended from the ceiling of an area where the user is standing. Assume also that the user decides to answer an incoming voice call. As the user lifts the mobile device to his ear (rather than use the speaker features of the mobile device), the user also rotates the mobile device such that, based on the change in orientation and/or trajectory of the device, it may be determined that an edge-surface light-capture device (e.g., such as the camera 246 depicted in FIG. 2) is the light-capture device that is likely to most directly face (i.e., have the best field-of-view) the light device that was, at the time the incoming call came, being detected and received by the front-surface light-capture device. Thus, based on the change in orientation and/or motion of the mobile device (corresponding to the user's hand gesture), the edge-surface light-capture device with the best field-of-view to the light source, previously detected by the front-surface, is activated while the front-surface light-capture device is deactivated. In some embodiments, if it is determined that additional ones of the multiple light-capture devices may also have a line-of-sight to the light device(s) transmitting light-based signals, those cameras may also be activated in this example situation. Thus, in some embodiments, selecting the at least one of the multiple light-capture devices of the mobile device may include selecting the second light-capture device (i.e., the camera disposed on the rear surface of the mobile device) in response to receipt of an incoming voice call at the mobile device, and a further determination, based on the physical state of the mobile device, of displacement of the mobile device in a direction towards a head of a user. In some embodiments, device usage data may also include historical data about the user's known device-usage habits and preferences. These habits and preferences may include, for example, where the user typically places the device (e.g., if the user is known to place the mobile device in the user's pocket, possibly only the top-edge surface camera, such as the camera 134 of FIG. 1, would need to be turned on more frequently to check for light-signal levels), whether the user frequently checks the mobile device for e-mail and text message notifications, etc.

Selecting which of the mobile device's multiple light-capture devices to activate (and/or deactivate) may also be based on detected light signals levels at one or more of currently active cameras. Sometimes, the image senor of a light-capture device being used might not be receiving a good VLC signal (under exposure or over exposed) because of the distance to the light device, because of environmental conditions, because of the particular hardware of software implementation of the light-capture device, or because of some obstruction (e.g., like a user's finger(s) covering the image sensor partially or fully). In such cases, the mobile device may be configured to select another image sensor (e.g., an adjacent image sensor for a device with dual side-by-side cameras on, for example, its back side) which has better capabilities of receiving the VLC signal.

More particularly, light-capture devices sensing light levels below some predetermined threshold (under which, detecting and/or decoding light-based signals may be too difficult, e.g., if the signal-to-noise ratio is too high) may be deactivated, with some of those light-captured devices currently turned off being selectively activated. For example, when first attempting to receive light-based signals from various light devices deployed in an area where the user and its mobile device are located, the mobile device's various light capture devices may be activated (e.g., one at a time, or simultaneously), and the received light level may be determined (as well as other metrics, such as decoding rate achievable through each light-capture device). Subsequently, those light-capture devices whose measured light-signal level is too low (e.g., below some threshold) may be deactivated, and another one or more of the multiple light-capture devices may be selected for activation. In some embodiments, the determination for a particular light-capture device of whether detected light levels, corresponding to light from light devices, is high enough may be based on a comparison of the light levels (measured by pixels on a sensor array for a particular light capture device) to background light levels. For example, on an image sensor (sensor array) for a particular light-capture device, the region of pixels which receives light from light fixtures/devices will generally be more brightly illuminated relative to the rest of the pixels. If the more brightly illuminated region is shaped similarly to a field-of-view expected for light received from a light device (e.g., a substantially rectangular or circular field-of-view), then light levels for background pixels (e.g., pixels outside the more brightly illuminated field-of-view corresponding to a light device) may be used as a reference light level to compare to the light levels within the more brightly illuminated area. In such embodiments, a determination as to whether light levels are high enough to warrant selection/activation of the corresponding light-capture device may be based on whether the relative light levels of the more brightly illuminated region exceed some relative threshold (e.g., whether a more brightly illuminated region is 5%, 10%, or some other percentage, brighter than the background light level). If the relative light level does not exceed the particular pre-determined relative threshold, the light capture device that captured the image, based on which the light level analysis was conducted, may be deactivated.

In some embodiments, selection, or non-selection of light-capture devices (receiving light signals from various light devices deployed in the area where the mobile device is located) may be based not only on low signal level determination, but on whether the received light levels are too high (e.g., resulting in over-exposure of the light devices). When the light signal level received from a particular light device is too high (e.g., relative to light levels of background pixels, with the relative allowable difference between the light levels expressed as some pre-determined high, or over-exposure, threshold), this may adversely affect VLC signal decoding (e.g., it may be more difficult to distinguish between light encoded symbols within the light signal). Thus, in an over exposure condition, an image sensor of a light-capture device may not be able to provide the VLC position. In such a situation, an over-exposed light-capture device may be unselected (or de-activated), and another light capture device may instead be selected/activated.

In some embodiments, selection of light-capture devices may also be based on the number of light devices detectable by the various light-capture devices. For example, in order to perform positioning determination for the mobile device, a minimum number of light devices may need to be detected (e.g., three (3) measurements may be needed, in some embodiments, to perform location determination). Thus, if the number of detectable light devices (as may be determined according to regions of pixels that are more brightly illuminated than background pixels, and which define shapes corresponding to shapes, such as a rectangle, a circle, etc., expected to result from illumination received from a light device) is less than some threshold number (e.g., a minimum number, such 1, 2, 3, or any pre-determined number), additional ones of the multiple light-capture devices may need to be turned on until the required number of light devices is detected. The selection of additional light-capture devices to activate may be random, may be made according to some pre-determined order of camera activation, or may be based on available data, such as location data for the mobile device and for light devices in the vicinity of the mobile device, usage data, etc., to controllably select the additional light-capture device to activate. For example, a candidate light-capture device facing an area that includes at least one light device (as may be inferred from the estimated orientation and location of the mobile device) may be selected for activation.

In one example implementation, one or more of the edge-surface light capture devices of the mobile device (e.g., the cameras 134 and/or 136 of the wireless mobile device 130 depicted in FIG. 1) may be selected/activated upon a determination that the light levels detected at the light-capture devices disposed on the front-surface and/or rear-surface of the mobile device is below a pre-determined low threshold, or above a high (also referred to as over-exposure) threshold (the threshold may be a relative threshold representative of a relative difference or deviation of a measured light level from a reference light level). Thus, in such an implementation, selecting at least one of the multiple light-capture devices may include selecting at least one edge-surface light-capture device of the mobile device in response to a further determination that respective light signal levels of light-based communication signals received through the first light-capture device (e.g., disposed on the front-surface of the mobile device) and the second light-capture device (e.g., disposed on the rear-surface of the mobile device) are below a pre-determined low threshold, or above a pre-determined over-exposure threshold. In some embodiments, upon selection and activation of the at least one edge-surface light-capture device, a determination may be made as to whether any light device are detectable from images captured by that edge-surface light capture device (and if so, whether light signal levels detected are adequate for decoding, for example, VLC transmissions from such viewable light devices). If there are viewable light devices detected by the now selected and activated edge-surface light-capture device, one or more of the first and second cameras may be de-activated (turned off).

Selection of which of the multiple light-capture devices to activate may also be based on location information (e.g., coarse or exact) for the mobile device and/or location information available for locations of light devices/sources in the area where the mobile device is located. This location information may have been obtained by any of the various procedures, processes, and techniques discussed herein. For example, position fixes for the mobile device may be derived through fingerprinting-based procedures, through implementations of multilateration-based procedures using, for example, on timing-based techniques (e.g., observed-time-difference-of-arrival (or OTDOA), RTT-based measurements, etc.), signal strength measurements (e.g., RSSI measurements), etc., performed in relation to RF signals received from satellite nodes and/or from ground-based (terrestrial) nodes. Furthermore, in some embodiments, a coarse location for the mobile device may be derived based on the identity of a wireless node (e.g., a cellular base station or WLAN access point), with the mobile device assigned a location approximation that may be, for example, the known location of the wireless node (that approximation may then correspond to a relatively high uncertainty level). Additionally, previous position fixes (which may be used to determine current position fixes for the mobile devices) may be derived according to a procedure such as that described in relation to FIG. 6A, in which a light device with a known location and known features (e.g., edges) and dimensions is identified through receipt of light-based communication from the light device by one of the light-capture devices of the mobile device, and computation of the location for the mobile device based on the location and visible features of the identified light device. Location information for the locations of the light sources transmitting light-based signals received by the mobile device may be obtained via assistance data (e.g., transmitted from a centralized remote server, such as the remote server 110 in FIG. 1, to a requesting mobile device or to mobile devices within a particular geographical area).

Accordingly, based on one or more of the current location of the mobile device and/or locations of light sources/fixtures in the area corresponding to the current location approximation for the mobile device, and based on changes to the orientation and/or motion of the mobile device, the controllable selection/activation of the multiple light-capture devices may be performed. As an example, and with reference to FIG. 1, consider a scenario in which the mobile device 130 is oriented so that the front surface 131 is positioned in the direction of the light device 120b. Assume also that the location of the mobile device 130 and its orientation have been derived, that the camera 132 is the only current active light-capture device from the mobile device's multiple light-capture devices and is receiving light-based signals from the light device 120b, and that the light device 120a is substantially behind the mobile device 130 and the user. Assume a situation in which the user starts moving the mobile device 130 in the direction of its head (e.g., to answer an incoming call). In this situation, the mobile device (or a remote server in communication with the mobile device) is configured to determine, based on the locations of the deployed light devices and the trajectory of the mobile device (and/or change to its orientation) that neither of the light devices will be in the field of view of the camera 132. The mobile device is further configured to determine/predict that when the mobile device reached its resultant orientation/location in which the front surface 131 will be facing the user's ear, the camera 136 will likely be positioned so that the light device 120*a* would be, at least partly, in that camera's field-of-view. Accordingly, the camera 136 may be selected to be activated (optionally preemptively activated, i.e., before the mobile device reaches its resultant position/orientation near the user's ear) based on the prediction of which light device will be viewable at the destination orientation. In another example scenario, the mobile device may be displaced from a first position to a second position (which may or may not be accompanied by a change to the mobile device's orientation relative to the user). The second location may be derived based on getting a position fix through received RF transmissions from nodes in communication with the mobile device, based on inertial sensor measurements (e.g., implementing dead-reckoning positioning functionality), through image data captured by one or more light-capture devices of the mobile device, and/or any other location determination functionality that may be realized by the mobile device. At the second, destination, location of the mobile device, a determination may be made of light devices/sources that are viewable by the mobile device from that second, destination, location (e.g., matching, based on assistance data obtained by the mobile device, the light devices in the area corresponding to the second, destination, location). Knowing the identity and locations of the light devices around the second location of the mobile device can thus be used to select one or more of the mobile device's multiple light-capture devices that may be activated to receive light-based signals from one or more of those light devices near the second location. The selection of which light-capture device to activate may also be based on the orientation of the mobile device (determined according to, for example, the processes and procedures described herein).

In some embodiments, selecting which of the multiple light-capture devices to activate may also be determined based on previous (historical) light signal levels that are sensed from surrounding light sources at a first location and/or a first orientation of the mobile device (e.g., at a first time instance). For example, the light signal levels, which generally would correlate with whether the surrounding light devices are viewable, may have been obtained by cycling through the light-capture devices (e.g., activating them intermittently). As the mobile device is moved, at a second, later, time instance, from a first location to a second, destination, location, or from a first orientation, to a second, destination orientation, the light signal levels at the first time instance (corresponding to the first location or the first orientation) may be used to predict the light signal levels, from the respective light devices, that would be detected by the various light-capture devices at the second, destination, location and/or orientation of the mobile device. Thus, in some embodiments, the physical state of the mobile device may include a current orientation data for the mobile device and prior orientation data, and selecting the at least one of the multiple light-capture devices may include selecting the at least one of the multiple light capture devices based further on light signal levels received at an earlier time instance, when the mobile device was at a first orientation, from one or more light devices emitting corresponding one or more light-based communications, and based on a current, second, orientation for the mobile device. In some embodiments, selecting the at least one of the multiple light-capture devices may include selecting the at least one of the multiple light capture devices based further on light signal levels received at an earlier time instance, when the mobile device was at a first location estimate, from one or more light devices emitting corresponding one or more light-based communications, and based on a current, second, location estimate for the mobile device.

Figure 9:
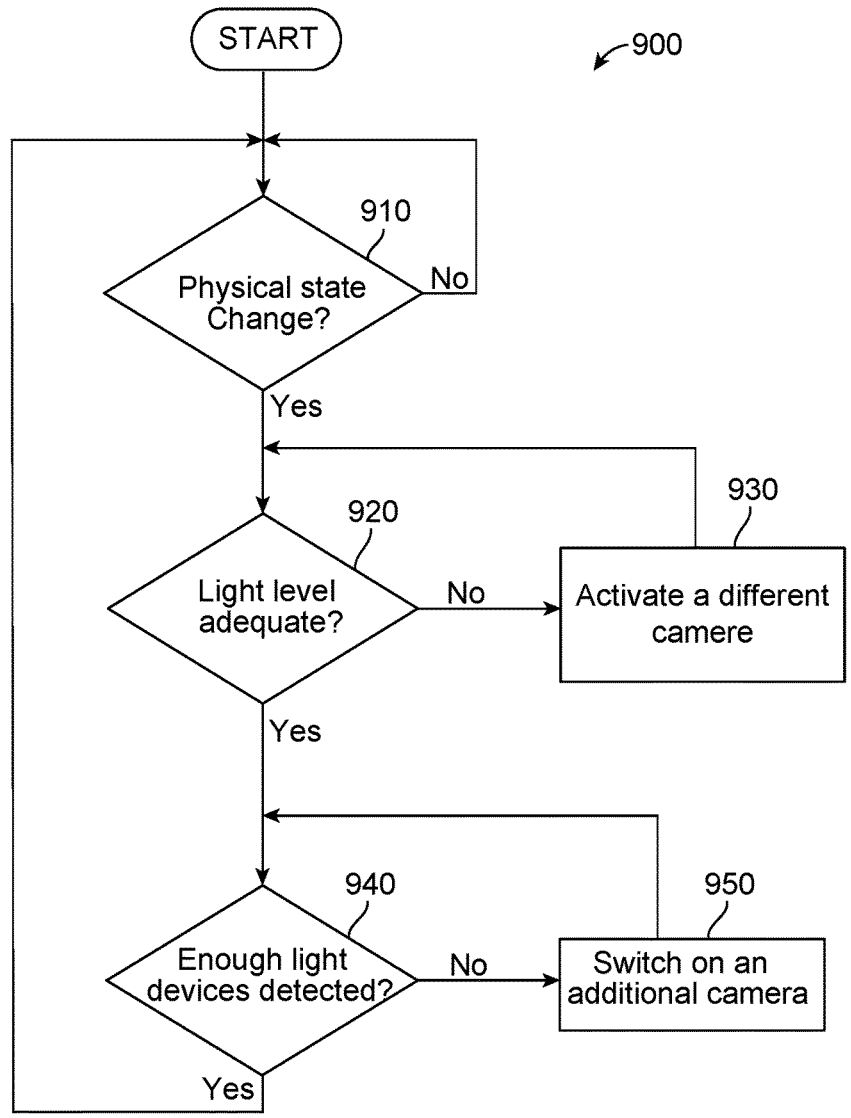
FIG. 9 is a flowchart of an example selection process to select one or more of multiple light-capture devices of a mobile device.

To illustrate one of many possible selection processes to control the light-capture device selection for a mobile device based on a combination of factors that include physical state data of the mobile device, as well as on such data as detected light signal levels, location information, usage information, etc., consider the following example selection process 900 shown in FIG. 9. The process 900 may be implemented at, for example, a mobile device such as the mobile devices 130, 220, 320, and 500 depicted in FIGS. 1, 2, 3, and 5. The process may include determining periodically 910 whether the mobile device has undergone a significant change to its physical state. That is, a determination may be made as to whether there has been a change to the mobile device's orientation or location/displacement (i.e., during some predetermined interval of time) that exceeds a corresponding physical state threshold (e.g., the mobile device has rotated more than, for example 5°, or some other value, or was displaced more than, for example, 2 feet, or some other value, since the last physical state measurement). If there has not been a significant enough change to the mobile device's physical state, the process 900 will perform another physical state check at a subsequent time (e.g., at some pre-determined interval).

If, on the other hand, a determination has been made that the mobile device has undergone a large enough change to its physical state since the last time the physical state was checked, then the process 900 next determines 920 whether the light level detected at its currently active light-capture device(s) is adequate. For example, as discussed herein, light signal levels received from one or more light devices by the currently selected light-capture devices are measured (e.g., relative to background signal levels), and a determination is made as to whether the relative light levels corresponding to the detected light signals are too low or too high. If the light levels at one or more of the currently selected light-capture devices is inadequate, another of the multiple light-capture devices may be activated 930. The selection of the other of the multiple light-capture devices may be random, may be made according to some pre-determined order of camera activation, or may be based on available data, such as location data for the mobile device and light devices in its vicinity, usage data, etc., to controllably select another candidate light-capture device to activate. For example, a candidate light-capture device facing an area with a largest number of light devices (as can be inferred from the estimated orientation and location of the mobile device) may be selected as the next light-capture device to be activated. Additionally and/or alternatively, a light-capture device facing an area that includes close-by devices (relative to other areas faced by the other light-capture devices) may be selected as the next candidate camera to select. Information about the deployment of light-capture devices (e.g., their locations in geographical areas) may be provided to the mobile device via maps and/or other types of assistance data (e.g., transmitted from a location server, such as the server 110 of FIG. 1).

Upon the selection and activation of the other light-capture device, the process 900 checks the light signal levels detected by the newly selected light-capture device to determine (at 920) if any light signals are detected (i.e., if there are any light devices viewable by the newly selected light-capture device), and if so, whether the light signal levels are adequate. If they are not, the process 900 proceeds again to 930 to de-activate that newly selected light-capture device, and select another one instead. In some embodiments, in the event that none of the available multiple light-capture devices is receiving light signals at adequate light levels (i.e., light levels are too low or too high), then the process 900 may select the light-capture device with the currently best light levels (from the light levels measured via the selection of light capture device at 930, and measurement of its light level at 920). In some embodiments, once a new camera is selected through the operations of 920 and 930, the camera(s) that was initially active at the commencement of the operations 920 and 930 may be de-activated (e.g., after the "hand-off" of light-signals-processing operations to the new camera(s)). However, in some embodiments, the initially active camera(s) may remain active (notwithstanding that the initial light signal levels detected were deemed to be inadequate). Additionally, in some embodiments, a low light signal level may be caused by some obstruction to the light-capture device (e.g., a user placing his/her thumb on the lens). Thus, the mobile device may, upon determining a low light signal level for one of the light-capture device (e.g., the initial light-capture device, or one of the candidate light-capture devices being selected through the operations 920 and 930), provide a prompt or an alert (e.g., an audible sound, a vibration of the device, etc.), to alert the user of the possibility of such an obstruction, and allow the user to take appropriate corrective action. Also, it will be noted that, in some embodiments, if at the time that the change in the physical state of the mobile device was detected, there was more than one activated light-capture device, and at least one of those activated light-capture devices is detecting light signal at an adequate light level, then any of the light-capture devices not detecting adequate light signal levels may be turned-off, but another alternate light-capture device would not necessarily need to be activated in its place (i.e., because there is already a light-capture device detecting light signals at an adequate level).

With continued reference to FIG. 9, having identified and/or selected at least one light-capture device that is receiving light signals from one or more light devices with an adequate signal level, a determination is made 940 of whether the images captured by the activated/selected light-capture device(s) include light signals from a minimum number of light devices (in some embodiments, the threshold minimum number of such light devices that need to be detected may be just one (1), but more light devices may be required to be detectable, e.g., so that sufficient measurements are available for position determination). Determining whether captured images contain light from a light device transmitting an encoded light signal may be performed using any of the techniques discussed herein, including by identifying regions of pixels with light levels that are higher than background pixels, and with the more brightly illuminated pixel regions defining shapes (e.g., rectangles, circles, etc.) corresponding to illumination shapes expected to be detected from light devices transmitting such light signals.

If it is determined that the number of light devices detected in the activated light-capture device(s) is equal to or greater than the minimum number required, the process 900 returns to the beginning of the process 900 to periodically check at 910 if a significant physical state change has been detected. If it is determined that the number of detected light devices in the captured images from the activated light-capture device(s) is below the minimum, the process 900 proceeds to activate (at 950) an additional light capture device, but without turning off the camera(s) already active. Selection of the additional camera(s) to activate may be done similarly to the selection operations described in relation to the operations of 930. For example, selection of candidate cameras to activate may be based on location information for current locations of the light devices (e.g., provided via maps or other types of assistance data) to identify likely areas with large number of light devices. Then, based further on physical state data of the mobile device (e.g., its orientation and/or approximate location), one of the mobile device's cameras that is facing one such identified area with a large number of light devices may be selected and activated. Optionally, in some embodiments, an additionally selected camera is first checked to determine if the light level detected by it from the light devices viewable by the camera is adequate (this optional operation is not shown in FIG. 9). If the light level is not adequate (too low, or too high), that additional camera is de-activated, and another camera, if available, may be selected instead. Having selected and activated the additional camera, the process returns to 940 to again check if the number of light devices detected by the currently activated light-capture device(s) is at least the minimum required number.

Thus, in some embodiments, selecting the at least one of the multiple light-capture devices of the mobile device may include determining a light signal level detected by a currently activated light-capture device from the multiple light-capture devices in response to a determination of a change of the physical state of the mobile device exceeding a physical state threshold, and in response to a determination that the determined light signal level is determined to be inadequate, de-activating the currently activated light-capture device, and activating another one of the multiple light-capture devices. When the determined light signal level detected by the currently light-capture device is determined to be adequate, a determination is made as to whether the currently activated light-capture device detects at least a minimum number of light devices.

As noted, the process 900 is just one example of possible processes that combine various factors to determine which of multiple light-capture devices of a mobile device to activate. Other selection processes, using different criteria/factors, according to different implementations, may be also be realized. For example, in another example implementation, selection and/or activation of the at least one light-captured device may be performed as follows. A change of the physical state of the mobile device may be determined (e.g., when the change, such as a motion change and/or orientation change, exceeds some pre-determined threshold). Upon determination of the change to the physical state of the mobile device, a determination may be made that an inactive light capture device is likely to be more directly facing the at least one VLC-capable light than a currently active light-capture device from the multiple light-capture devices, and thus the more directly facing light capture device is activated. Subsequently, at least one received image measured at the currently active light-capture device is compared to another at least one received image measured at the more directly facing light capture device. The currently active light-capture device may then be de-activated (e.g., if it is determined that the more directly facing camera has a better view of light devices, or that it is receiving better measurements, than the currently active camera). In some situations for this example implementation, the process may further include determining that the more directly facing light capture device detects at least a minimum number of light devices. In some further embodiments, the process may further include determining an indication of detected light for the currently activated light-capture device and the more directly facing light-capture device light signal level, with the indication of detected light including, for example, light signal levels of light signals detected by each of the currently active light-capture device and the more directly facing light-capture device, and/or field of view of light devices from each of the currently active and the more directly facing light-capture device. In such embodiments, the process also includes selecting for operation the currently active light-capture device, or the more directly facing light-capture device, or both, based on the indication of detected light.

Turning back to FIG. 8, having selected, and activated, at least one of the multiple light-capture devices of the mobile device, at least one image, comprising at least one Visual Light Communication (VLC) capable light device (or some other light communication procedure or technology) is captured 830 with the selected at least one of the multiple light-capture devices. As discussed, the capturing may be performed with a camera that includes an a digital sensor, such as a CMOS image sensor, a charge-couple device (CCD)-type camera, etc., operating in conjunction with a gradual-exposure mechanism (e.g., a rolling shutter) that captures the scene over a period of time, with different scan lines (or rows) corresponding to different time instances during which the modulated light signal varies (in a manner that is not perceptible to humans, but which nonetheless can be resolved using the light-capture device).

With the image (or several images) captured by the selected at least one of the multiple light-capture devices, at least part of an identifier (or some other content encoded in a light communication received by the mobile device through the selected camera(s)), of the at least one VLC capable light device is decoded 840. If the coarse or approximate location of the mobile device is known, only part of an identifier may need to be decoded in order to determine the identifier encoded into the light signal. For example, the decoded portion of the identifier may be uniquely matched to a light device within the approximate area where the mobile device is determined to be located in. Decoding the at least part of the identifier may include identifying from the captured image(s) at least one time-domain signal representative of one or more symbols comprising at least one VLC codeword encoded in the at least one VLC signal, and determining, at least in part, the at least one VLC codeword from the at least one time-domain signal identified from the captured at least part of the at least one image. The determined VLC codeword may correspond to an identifier identifying the light device/source from which the light-based signal was received, and thus the identity of the light device, and by extension the known location associated with that light device, can be determined. As noted, the decoding of VLC signals (or other types of light-based signals) may be performed, for example, by the codeword derivation module 550 of FIG. 5. The symbols extracted from may represent at least a portion of the codeword (e.g., an identifier) encoded into the light-based communication, or may represent some other type of information. In some situations, the symbols extracted may include sequential (e.g., consecutive) symbols of the codeword, while in some situations the sequences of symbols may include at least two non-consecutive sub-sequences of the symbols from a single instance of the codeword, or may include symbol subsequences from two transmission frames (which may or may not be adjacent frames) of the light source (i.e., from separate instances of a repeating light-based communication).

Having determined the identifier (or a portion thereof), the location of the mobile device is then determined 850 based, at least in part, on the identifier of the at least one VLC capable light device. The determined identifier (derived from the decoding of the VLC signal) identifies the light device/source from which the light-based signal was received, and thus the identity of the light device, thus allowing determination of the known location associated with that light device, can be determined. In some embodiments, the location of the mobile device can then be determined based on any of the procedures and techniques described herein. For example, the location of the mobile device may be computed based on the angle of arrival of the light signal from the light device(s) identified from the transmitted light signals and further based on the locations of the transmitting light devices. Angle of arrival may be determined using, for example, a procedure such as that described in relation tom FIG. 6B. In some embodiments, the location of the mobile device may be determined based on the known location of the light devices transmitting the light signals, and based on features and dimensions of the identified light device(s) (e.g., by performing a process similar to that described in relation to FIG. 6A).

Figure 10:
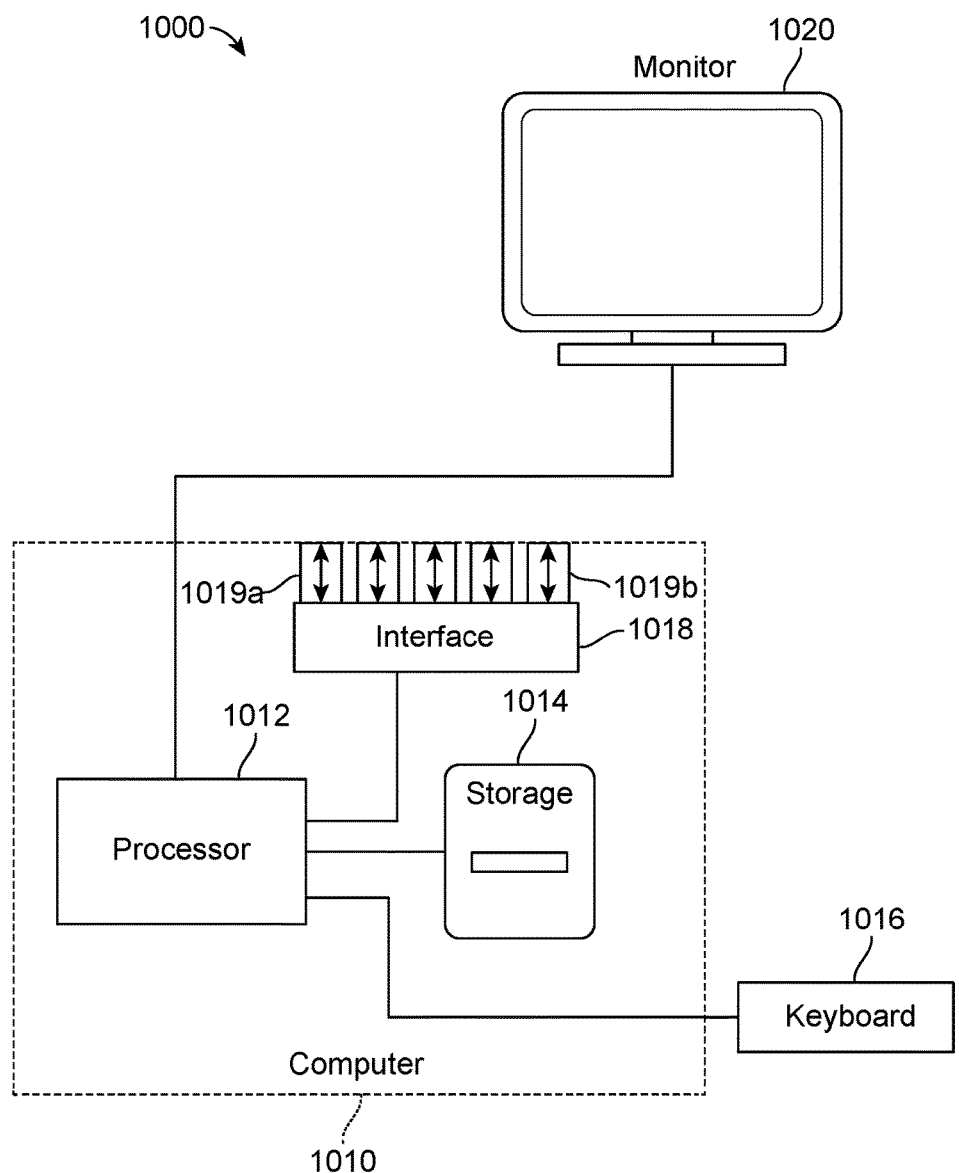
FIG. 10 is a schematic diagram of a computing system.

Performing the procedures described herein may be facilitated by a processor-based computing system. With reference to FIG. 10, a schematic diagram of an example computing system 1000 is shown. Part or all of the computing system 1000 may be housed in, for example, a handheld mobile device such as the devices 130, 220, 320, and 500 of FIGS. 1, 2, 3, and 5, respectively, or may comprise part or all of the servers, nodes, access points, base stations, or light devices described herein, including the light devices 120a-b, and/or the nodes 104a-c and 106a-d, depicted in FIG. 1. The computing system 1000 includes a computing-based device 1010 such as a personal computer, a specialized computing device, a controller, and so forth, that typically includes a central processor unit 1012. In addition to the CPU 1012, the system includes main memory, cache memory and bus interface circuits (not shown). The computing-based device 1010 may include a mass storage device 1014, such as a hard drive and/or a flash drive associated with the computer system. The computing system 1000 may optionally further include a keyboard, or keypad, 1016, and/or a monitor 1020, e.g., a CRT (cathode ray tube) or LCD (liquid crystal display) monitor, that may be placed where a user can access them (e.g., a mobile device's screen). In some embodiments, the keyboard and monitor may be located remotely from the computing-based device 1101 (e.g., when the computing-based device is a central server that operators can access remotely).

The computing-based device 1010 is configured to facilitate, for example, the implementation of one or more of the procedures/processes/techniques described herein (including the procedures for intelligent light-capture device selection in which one or more of multiple light-capture devices of a mobile device are selected based on physical state data, such as orientation and/or motion data, for the mobile device, and optionally based on other data, including location data, mobile device usage data, sensed light signal level data, etc.) The mass storage device 1014 may thus include a computer program product that when executed on the computing-based device 1010 causes the computing-based device to perform operations to facilitate the implementation of the procedures described herein. The computing-based device may further include peripheral devices to provide input/output functionality. Such peripheral devices may include, for example, a CD-ROM drive and/or flash drive, or a network connection, for downloading related content to the connected system. Such peripheral devices may also be used for downloading software containing computer instructions to enable general operation of the respective system/device. For example, as illustrated in FIG. 10, the computing-based device 1010 may include an interface 1018 with one or more interfacing circuits, Such interfacing circuits may include, for example, a wireless port that includes transceiver circuitry, a network port (such as a port 1019a) with circuitry to interface with one or more network device (including with network devices that include a radio-access network (RAN), a WiFi network, and so on), a powerline interface (such as an interface 1019b) to interface with devices (such as light devices as the light device 230 and/or the controller 210 of FIG. 2) via powerlines, and other types of interfaces to provide/implement communication with remote devices. Alternatively and/or additionally, in some embodiments, special purpose logic circuitry, e.g., an FPGA (field programmable gate array), a DSP processor, or an ASIC (application-specific integrated circuit) may be used in the implementation of the computing system 1000. Other modules that may be included with the computing-based device 1010 are speakers, a sound card, a pointing device, e.g., a mouse or a trackball, by which the user can provide input to the computing system 1000. The computing-based device 1010 may include an operating system.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal.

Memory may be implemented within the computing-based device 1010 or external to the device. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

As used herein, a mobile device or station (MS) refers to a device such as a cellular or other wireless communication device, a smartphone, tablet, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile station" (or "mobile device" or "wireless device") is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, tablet devices, etc., which are capable of communication with a server, such as via the Internet, WiFi, or other network, and to communicate with one or more types of nodes, regardless of whether satellite signal reception, assistance data reception, and/or position-related processing occurs at the device, at a server, or at another device or node associated with the network. Any operable combination of the above are also considered a "mobile station." A mobile device may also be referred to as a mobile terminal, a terminal, a user equipment (UE), a device, a Secure User Plane Location Enabled Terminal (SET), a target device, a target, or by some other name.

While some of the techniques, processes, and/or implementations presented herein may comply with all or part of one or more standards, such techniques, processes, and/or implementations may not, in some embodiments, comply with part or all of such one or more standards.

The detailed description set forth above in connection with the appended drawings is provided to enable a person skilled in the art to make or use the disclosure. It is contemplated that various substitutions, alterations, and modifications may be made without departing from the spirit and scope of the disclosure. Throughout this disclosure the term "example" indicates an example or instance and does not imply or require any preference for the noted example. The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments. Thus, the disclosure is not to be limited to the examples and designs described herein but is to be accorded the widest scope consistent with the principles and novel features disclosed herein.

Although particular embodiments have been disclosed herein in detail, this has been done by way of example for purposes of illustration only, and is not intended to be limiting with respect to the scope of the appended claims, which follow. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method to determine a location of a mobile device, the method comprising:
    determining a physical state of the mobile device, wherein the mobile device comprises multiple light-capture devices;
    selecting at least one of the multiple light-capture devices of the mobile device based, at least in part, on the determined physical state of the mobile device;
    capturing at least one image, comprising at least one Visual Light Communication (VLC)-capable light device, with the selected at least one of the multiple light-capture devices;
    decoding at least part of an identifier of the at least one VLC-capable light device; and
    determining the location of the mobile device based, at least in part, on the identifier of the at least one VLC-capable light device.

2. The method of claim 1, wherein determining the physical state of the mobile device comprises determining: orientation of the mobile device, or motion of the mobile device, or any combination thereof.

3. The method of claim 1, wherein determining the physical state of the mobile device comprises:
    determining relative physical state of the mobile device, including: respective number of light devices viewable from at least some of the multiple light-capture devices, distance of the respective light devices viewable from the at least some of the multiple light-capture devices to the mobile device, or relative orientation of the mobile device to the respective light devices viewable from the at least some of the multiple light-capture devices, or any combination thereof.

4. The method of claim 3, wherein determining the relative physical state of the mobile device comprises:
    performing scans by the at least some of the multiple light-capture devices of respective areas viewable from the at least some of the multiple light-capture devices.

5. The method of claim 1, wherein selecting the at least one of the multiple light-capture devices of the mobile device comprises:
    selecting the at least one of the multiple light-capture devices of the mobile device based further on: a current orientation of the mobile device, or the current orientation of the mobile device with a current location estimate for the mobile device and location approximations for one or more light devices configured to transmit light-based communications.

6. The method of claim 1, wherein selecting the at least one of the multiple light-capture devices of the mobile device comprises:
    selecting the at least one of the multiple light-capture devices based further on respective light signal levels for respective light-based communications detected by one or more of the multiple light-capture devices.

7. The method of claim 1, wherein selecting the at least one of the multiple light-capture devices of the mobile device comprises:
    determining a change of the physical state of the mobile device;
    determining that an inactive light capture device is likely to be more directly facing the at least one VLC-capable light than a currently active light-capture device from the multiple light-capture devices;
    activating the more directly facing light capture device;
    comparing at least one received image measured at the currently active light-capture device to an other at least one received image measured at the more directly facing light capture device; and
    de-activating the currently active light-capture device.

8. The method of claim 7, further comprising:
    in response to determining whether the more directly facing light capture device detects fewer than a minimum number of light devices, causing at least one other light-capture device to be active.

9. The method of claim 7, further comprising:
    determining an indication of detected light for the currently active light-capture device and the more directly facing light-capture device light signal level, the indication of detected light comprising: light signal levels of light signals detected by each of the currently active light-capture device and the more directly facing light-capture device, field of view for light devices from each of the currently active and the more directly facing light-capture device, or any combination thereof; and
    selecting for operation the currently active light-capture device, or the more directly facing light-capture device, or both, based on the indication of detected light.

10. The method of claim 1, wherein the multiple light-capture devices comprise: a first light-capture device located on a front surface of the mobile device, wherein the front surface of the mobile device further comprises a visual display, and a second light-capture device disposed on a rear surface of the mobile device substantially opposite the front surface of the mobile device.

11. The method of claim 10, wherein the multiple light-capture devices further comprise:
    at least one third, edge, light-capture device disposed on an edge surface located between the front surface and the rear surface of the mobile device.

12. The method of claim 11, wherein selecting the at least one of the multiple light-capture devices comprises:

selecting the at least one third, edge light-capture device of the mobile device in response to a further determination that respective light signal levels of light-based communication signals received through the first light-capture device and the second light-capture device are below a pre-determined low threshold, or above a pre-determined over-exposure threshold.

13. The method of claim 10, wherein selecting the at least one of the multiple light-capture devices of the mobile device comprises:
selecting the second light-capture device, disposed on the rear surface of the mobile device substantially opposite the front surface of the mobile device, in response to a determination of receipt of a voice call at the mobile device, and a further determination, based on the physical state of the mobile device, of displacement of the mobile device in a direction towards a head of a user.

14. The method of claim 10, wherein determining the physical state of the mobile device comprises determining that the mobile device is substantially vertical, and wherein selecting the at least one of the multiple light-capture devices comprises:
selecting a top light-capture device, disposed on a top edge surface of the mobile device, in response to a determination that the mobile device is substantially vertical.

15. The method of claim 1, wherein the physical state of the mobile device comprises current orientation data for the mobile device and prior orientation data, and wherein selecting the at least one of the multiple light-capture devices comprises:
selecting the at least one of the multiple light-capture devices based further on light signal levels received at an earlier time instance, when the mobile device was at a first orientation, from one or more light devices configured to transmit one or more light-based communications, and based on a current, second, orientation for the mobile device.

16. The method of claim 1, wherein selecting the at least one of the multiple light-capture devices comprises:
selecting the at least one of the multiple light capture devices based further on light signal levels received at an earlier time instance, when the mobile device was at a first location estimate, from one or more light devices configured to transmit one or more light-based communications, and based on a current, second, location estimate for the mobile device.

17. The method of claim 1, wherein decoding the at least part of the identifier of the at least one VLC-capable light device comprises:
identifying from the captured image at least one time-domain signal representative of one or more symbols comprising at least part of at least one VLC codeword encoded in a received at least one VLC signal; and
determining the at least one VLC codeword, based at least in part upon the at least one time-domain signal identified from the captured at least part of the at least one image.

18. The method of claim 1, wherein the at least one of the multiple light-capture devices comprises a digital light sensor with rolling shutter capability.

19. A mobile device comprising:
one or more orientation sensors configured to obtain measurements relating to a physical state of the mobile device;
multiple light-capture devices;
memory to store computer instructions; and
one or more processors coupled to the memory, the one or more orientation sensors, and the multiple light-capture devices, the one or more processors configured to:
determine the physical state of the mobile device based, at least in part, the measurements obtained by the one or more orientation sensors;
select at least one of the multiple light-capture devices of the mobile device based, at least in part, on the determined physical state of the mobile device;
wherein the selected at least one of the multiple light-capture devices is configured to:
capture at least one image, comprising at least one Visual Light Communication (VLC)-capable light device;
and wherein the one or more processors are further configured to:
decode at least part of an identifier of the at least one VLC-capable light device; and
determine the location of the mobile device based, at least in part, on the identifier of the at least one VLC-capable light device.

20. The mobile device of claim 19, wherein the one or more processors configured to determine the physical state of the mobile device are configured to determine: orientation of the mobile device, or motion of the mobile device, or any combination thereof.

21. The mobile device of claim 19, wherein the one or more processors configured to determine the physical state of the mobile device are configured to:
determine relative physical state of the mobile device, including: respective number of light devices viewable from at least some of the multiple light-capture devices, distance of the respective light devices viewable from the at least some of the multiple light-capture devices to the mobile device, or relative orientation of the mobile device to the respective light devices viewable from the at least some of the multiple light-capture devices, or any combination thereof.

22. The mobile device of claim 21, wherein the one or more processors configured to determine the relative physical state of the mobile device are configured to:
perform scans by the at least some of the multiple light-capture devices of respective areas viewable from the at least some of the multiple light-capture devices.

23. The mobile device of claim 19, wherein the one or more processors configured to select the at least one of the multiple light-capture devices of the mobile device are configured to:
determine a change of the physical state of the mobile device;
determine that an inactive light capture device is likely to be more directly facing the at least one VLC-capable light than a currently active light-capture device from the multiple light-capture devices;
activate the more directly facing light capture device;
compare at least one received image measured at the currently active light-capture device to an other at least one received image measured at the more directly facing light capture device; and
de-activate the currently active light-capture device.

24. The mobile device of claim 23, wherein the one or more processors are further configured to:
determine an indication of detected light for the currently active light-capture device and the more directly facing light-capture device light signal level, the indication of detected light comprising: light signal levels of light signals detected by each of the currently active light-capture device and the more directly facing light-capture device, field of view for light devices from each of the currently active and the more directly facing light-capture device, or any combination thereof; and select for operation the currently active light-capture device, or the more directly facing light-capture device, or both, based on the indication of detected light.

25. The mobile device of claim 19, wherein the multiple light-capture devices comprise: a first light-capture device located on a front surface of the mobile device, wherein the front surface of the mobile device further comprises a visual display, and a second light-capture device disposed on a rear surface of the mobile device substantially opposite the front surface of the mobile device.

26. The mobile device of claim 25, wherein the multiple light-capture devices further comprise at least one edge light-capture device disposed on an edge surface located between the front surface and the rear surface of the mobile device, and wherein the one or more processors configured to select the at least one of the multiple light-capture devices are configured to:

select the at least one edge light-capture device of the mobile device in response to a further determination that respective light signal levels of light-based communication signals received through the first light-capture device and the second light-capture device are below a pre-determined low threshold, or above a pre-determined over-exposure threshold.

27. An apparatus comprising:

means for determining a physical state of a mobile device, wherein the mobile device comprises multiple light-capture devices;

means for selecting at least one of the multiple light-capture devices of the mobile device based, at least in part, on the determined physical state of the mobile device;

means for capturing at least one image, comprising at least one Visual Light Communication (VLC)-capable light device, with the selected at least one of the multiple light-capture devices;

means for decoding at least part of an identifier of the at least one VLC-capable light device; and means for determining the location of the mobile device based, at least in part, on the identifier of the at least one VLC-capable light device.

28. The apparatus of claim 27, wherein the means for determining the physical state of the mobile device comprises means for determining: orientation of the mobile device, or motion of the mobile device, or any combination thereof.

29. The apparatus of claim 27, wherein the means for determining the physical state of the mobile device comprises:

means for determining relative physical state of the mobile device, including: respective number of light devices viewable from at least some of the multiple light-capture devices, distance of the respective light devices viewable from the at least some of the multiple light-capture devices to the mobile device, or relative orientation of the mobile device to the respective light devices viewable from the at least some of the multiple light-capture devices, or any combination thereof.

30. A non-transitory computer readable media programmed with instructions, executable on a processor, to:

determine a physical state of a mobile device, wherein the mobile device comprises multiple light-capture devices;

select at least one of the multiple light-capture devices of the mobile device based, at least in part, on the determined physical state of the mobile device;

capture at least one image, comprising at least one Visual Light Communication (VLC)-capable light device, with the selected at least one of the multiple light-capture devices;

decode at least part of an identifier of the at least one VLC-capable light device; and determine the location of the mobile device based, at least in part, on the identifier of the at least one VLC-capable light device.

* * * * *